United States Patent
Sharp

(10) Patent No.: US 11,190,600 B2
(45) Date of Patent: Nov. 30, 2021

(54) SYSTEMS AND METHODS FOR FACILITATING DISCOVERY OF USERS WHO SHARE COMMON CHARACTERISTICS WITHIN A SOCIAL NETWORKING SYSTEM

(71) Applicant: Facebook, Inc., Menlo Park, CA (US)

(72) Inventor: Nathan Andrew Sharp, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/377,774

(22) Filed: Apr. 8, 2019

(65) Prior Publication Data

US 2019/0342402 A1 Nov. 7, 2019

Related U.S. Application Data

(60) Provisional application No. 62/665,478, filed on May 1, 2018, provisional application No. 62/720,493, filed
(Continued)

(51) Int. Cl.
*H04L 29/08* (2006.01)
*H04L 12/58* (2006.01)

(52) U.S. Cl.
CPC .............. *H04L 67/16* (2013.01); *H04L 51/32* (2013.01); *H04L 67/306* (2013.01)

(58) Field of Classification Search
CPC ...... H04L 67/16; H04L 51/132; H04L 67/306
See application file for complete search history.

(56) References Cited

U.S. PATENT DOCUMENTS

| 7,085,806 B1 | 8/2006 | Shapira |
| D575,792 S | 8/2008 | Benson |

(Continued)

FOREIGN PATENT DOCUMENTS

| WO | 2019/212834 A1 | 11/2019 |
| WO | 2019/213124 A1 | 11/2019 |
| WO | 2019/213127 A1 | 11/2019 |

OTHER PUBLICATIONS

Preinterview First Office Action received for U.S. Appl. No. 16/398,145 dated Jan. 30, 2020, 32 pages.
(Continued)

*Primary Examiner* — Rupal Dharia
*Assistant Examiner* — Adam A Cooney
(74) *Attorney, Agent, or Firm* — FisherBroyles, LLP

(57) ABSTRACT

The disclosed computer-implemented method may include (1) receiving, via a social networking system, a request from a user to participate in a discovery service designed to facilitate connections between users of the social networking system who share common attributes, (2) obtaining, from the user, data representative of at least one desired user attribute, possessed by the user, for new user connections, (3) identifying, within the social networking system, at least one additional user who is both a participant in the discovery service and who also possesses the desired user attribute, and (4) providing a visual indication to the user, when representing the additional user within a user interface of the social networking system, that the additional user is a participant in the discovery service and that the additional user possesses the desired user attribute. Various other methods, systems, and computer-readable media are also disclosed.

20 Claims, 11 Drawing Sheets

Related U.S. Application Data on Aug. 21, 2018, provisional application No. 62/757,128, filed on Nov. 7, 2018.

(56) References Cited

U.S. PATENT DOCUMENTS

| | | |
|---|---|---|
| D597,101 S | 7/2009 | Chaudhri et al. |
| D599,813 S | 9/2009 | Hirsch |
| D603,416 S | 11/2009 | Poling et al. |
| D622,283 S | 8/2010 | Van Os |
| D624,556 S | 9/2010 | Chaudhri |
| D626,134 S | 10/2010 | Chaudhri |
| D633,918 S | 3/2011 | Vance et al. |
| D633,921 S | 3/2011 | Brinda |
| D636,400 S | 4/2011 | Vance et al. |
| D638,853 S | 5/2011 | Brinda |
| D640,274 S | 6/2011 | Arnold |
| D640,276 S | 6/2011 | Woo |
| D650,393 S | 12/2011 | Doll |
| D652,050 S | 1/2012 | Chaudhri |
| D657,378 S | 4/2012 | Vance et al. |
| D658,679 S | 5/2012 | Davydov et al. |
| D661,312 S | 6/2012 | Vance et al. |
| D668,665 S | 10/2012 | Chen et al. |
| 8,295,851 B2 | 10/2012 | Finnegan et al. |
| D670,724 S | 11/2012 | Mori et al. |
| D671,135 S | 11/2012 | Arnold et al. |
| D671,140 S | 11/2012 | Guss et al. |
| D671,553 S | 11/2012 | Frijlink et al. |
| D673,169 S | 12/2012 | Arnold et al. |
| D677,691 S | 3/2013 | Frijlink |
| D679,730 S | 4/2013 | Tyler et al. |
| D682,292 S | 5/2013 | Mori et al. |
| D682,870 S | 5/2013 | Roberts et al. |
| D682,872 S | 5/2013 | Frijlink |
| D683,738 S | 6/2013 | Wujcik et al. |
| D686,221 S | 7/2013 | Brinda et al. |
| D686,231 S | 7/2013 | Rodenhouse et al. |
| D686,634 S | 7/2013 | Malasani et al. |
| D687,446 S | 8/2013 | Arnold et al. |
| D687,840 S | 8/2013 | Arnold et al. |
| D689,510 S | 9/2013 | Rodrigues et al. |
| D691,164 S | 10/2013 | Lim et al. |
| D692,910 S | 11/2013 | Anzures et al. |
| D695,754 S | 12/2013 | Woo-Seok et al. |
| D699,740 S | 2/2014 | Woo |
| D699,743 S | 2/2014 | Arnold et al. |
| D701,868 S | 4/2014 | Chaudhri |
| D704,211 S | 5/2014 | Agnew et al. |
| D709,080 S | 7/2014 | Kim |
| D711,402 S | 8/2014 | Thornton et al. |
| D711,406 S | 8/2014 | Hurd et al. |
| D714,816 S | 10/2014 | Varon |
| D720,765 S | 1/2015 | Xie et al. |
| D725,666 S | 3/2015 | Tseng et al. |
| D725,670 S | 3/2015 | Zhang et al. |
| D727,930 S | 4/2015 | Kim et al. |
| D728,601 S | 5/2015 | Angelides |
| D729,263 S | 5/2015 | Ahn et al. |
| D730,367 S | 5/2015 | Ryan et al. |
| D732,049 S | 6/2015 | Amin |
| D732,062 S | 6/2015 | Kwon |
| D733,175 S | 6/2015 | Bae |
| D734,350 S | 7/2015 | Inose et al. |
| D735,234 S | 7/2015 | Chae et al. |
| D735,742 S | 8/2015 | Lee et al. |
| D736,246 S | 8/2015 | Zhang et al. |
| D736,247 S | 8/2015 | Chen et al. |
| D736,248 S | 8/2015 | Chen et al. |
| D736,808 S | 8/2015 | Soegiono et al. |
| D736,815 S | 8/2015 | Niijima et al. |
| D737,283 S | 8/2015 | Scalisi |
| D737,833 S | 9/2015 | Anzures et al. |
| D738,902 S | 9/2015 | Roberts et al. |
| D739,870 S | 9/2015 | Roberts et al. |
| D743,434 S | 11/2015 | Chaudhri |
| D744,502 S | 12/2015 | Wilberding et al. |
| D744,503 S | 12/2015 | Wilberding et al. |
| D744,504 S | 12/2015 | Wilberding et al. |
| D744,520 S | 12/2015 | McLaughlin et al. |
| D745,052 S | 12/2015 | Um et al. |
| D745,546 S | 12/2015 | Johnson et al. |
| D746,861 S | 1/2016 | Park et al. |
| D749,604 S | 2/2016 | Trousdell et al. |
| D749,608 S | 2/2016 | Bae |
| D749,625 S | 2/2016 | Yang et al. |
| D752,604 S | 3/2016 | Zhang |
| D753,702 S | 4/2016 | Zhou |
| D754,689 S | 4/2016 | Lee |
| D754,690 S | 4/2016 | Park et al. |
| D754,719 S | 4/2016 | Zha |
| D755,212 S | 5/2016 | Bae |
| D755,215 S | 5/2016 | Lee et al. |
| D755,216 S | 5/2016 | Lee et al. |
| D755,830 S | 5/2016 | Chaudhri et al. |
| D759,723 S | 6/2016 | Butcher et al. |
| D760,768 S | 7/2016 | Um et al. |
| D760,773 S | 7/2016 | Cho et al. |
| D761,294 S | 7/2016 | Weeresinghe |
| D761,818 S | 7/2016 | Jung et al. |
| D762,696 S | 8/2016 | Chen |
| D763,271 S | 8/2016 | Everette et al. |
| D763,275 S | 8/2016 | Loosli et al. |
| D763,870 S | 8/2016 | Kim |
| D763,882 S | 8/2016 | Liang |
| D763,898 S | 8/2016 | Raykovich et al. |
| D765,110 S | 8/2016 | Liang |
| D765,118 S | 8/2016 | Bachman et al. |
| D765,698 S | 9/2016 | Kwon |
| D767,621 S | 9/2016 | Gagnier |
| D768,642 S | 10/2016 | Li et al. |
| D768,676 S | 10/2016 | Edwards et al. |
| D769,888 S | 10/2016 | Li et al. |
| D770,487 S | 11/2016 | Li |
| D770,488 S | 11/2016 | Li |
| D772,906 S | 11/2016 | Fu |
| D772,909 S | 11/2016 | Chen |
| D772,918 S | 11/2016 | Van den Berg et al. |
| D773,516 S | 12/2016 | Sun |
| D776,126 S | 1/2017 | Lai et al. |
| D776,147 S | 1/2017 | Simmons et al. |
| D777,195 S | 1/2017 | Dain et al. |
| D777,741 S | 1/2017 | Hao et al. |
| D777,745 S | 1/2017 | Ta |
| D777,768 S | 1/2017 | Persson et al. |
| D778,944 S | 2/2017 | Kim |
| D779,516 S | 2/2017 | Pierson et al. |
| D780,775 S | 3/2017 | Rad et al. |
| D781,311 S | 3/2017 | Rad et al. |
| D781,339 S | 3/2017 | Li et al. |
| D781,881 S | 3/2017 | Cornell |
| D781,882 S | 3/2017 | Rad et al. |
| D784,371 S | 4/2017 | Loosli et al. |
| D785,045 S | 4/2017 | Coffman et al. |
| D786,274 S | 5/2017 | Lee et al. |
| D788,139 S | 5/2017 | Lee et al. |
| D788,157 S | 5/2017 | Kim et al. |
| D789,388 S | 6/2017 | Gedrich et al. |
| D789,947 S | 6/2017 | Sun |
| D789,949 S | 6/2017 | Sun |
| D789,964 S | 6/2017 | Apodaca et al. |
| D790,569 S | 6/2017 | Anzures et al. |
| D790,589 S | 6/2017 | Hart et al. |
| D791,170 S | 7/2017 | Sun |
| D791,171 S | 7/2017 | Sun |
| D791,818 S | 7/2017 | Sun |
| D792,420 S | 7/2017 | van den Berg et al. |
| D792,427 S | 7/2017 | Weaver et al. |
| D792,446 S | 7/2017 | Sun |
| D792,903 S | 7/2017 | Park et al. |
| D793,406 S | 8/2017 | Kim et al. |
| D793,427 S | 8/2017 | Sun |
| D794,651 S | 8/2017 | Cavander et al. |
| D794,661 S | 8/2017 | Nishizawa et al. |
| D795,893 S | 8/2017 | Kim et al. |

(56) References Cited

U.S. PATENT DOCUMENTS

| | | |
|---|---|---|
| D795,918 S | 8/2017 | Bischoff et al. |
| D797,132 S | 9/2017 | Rhodes et al. |
| D797,133 S | 9/2017 | Marcolongo et al. |
| D797,769 S | 9/2017 | Li |
| D797,771 S | 9/2017 | Caporal et al. |
| D798,316 S | 9/2017 | Bradley et al. |
| D798,333 S | 9/2017 | Dascola et al. |
| D798,334 S | 9/2017 | Dye et al. |
| D799,504 S | 10/2017 | Chen et al. |
| D803,844 S | 11/2017 | Lee et al. |
| D803,871 S | 11/2017 | Kim |
| D804,520 S | 12/2017 | Kim |
| D805,090 S | 12/2017 | Gouvernel et al. |
| D805,541 S | 12/2017 | Juliano |
| D805,543 S | 12/2017 | Baker |
| D807,387 S | 1/2018 | Cho et al. |
| D807,899 S | 1/2018 | Hilhorst et al. |
| D808,399 S | 1/2018 | Derby et al. |
| D810,762 S | 2/2018 | Guerimand et al. |
| D810,772 S | 2/2018 | Wang et al. |
| D811,433 S | 2/2018 | Dye et al. |
| D812,098 S | 3/2018 | Chung |
| D815,128 S | 4/2018 | Phillips et al. |
| D819,059 S | 5/2018 | O'Toole |
| D819,647 S | 6/2018 | Chen et al. |
| D822,711 S | 7/2018 | Bachman et al. |
| D823,870 S | 7/2018 | Yan |
| D824,409 S | 7/2018 | Harvey et al. |
| D824,416 S | 7/2018 | Memmelaar, Jr. et al. |
| D824,930 S | 8/2018 | Spector |
| D825,590 S | 8/2018 | Sagrillo et al. |
| D826,256 S | 8/2018 | Tsuji et al. |
| D826,968 S | 8/2018 | Varshavskaya et al. |
| D828,370 S | 9/2018 | Lee et al. |
| D828,852 S | 9/2018 | Park et al. |
| D829,219 S | 9/2018 | Bae et al. |
| D830,375 S | 10/2018 | Phillips et al. |
| D833,457 S | 11/2018 | Deng |
| D834,596 S | 11/2018 | Bae et al. |
| D834,597 S | 11/2018 | Bae et al. |
| D834,598 S | 11/2018 | Bae et al. |
| D834,599 S | 11/2018 | Hwang et al. |
| D835,151 S | 12/2018 | Martin et al. |
| D836,124 S | 12/2018 | Fan |
| D838,732 S | 1/2019 | Furdei et al. |
| D839,302 S | 1/2019 | Lu et al. |
| D841,024 S | 2/2019 | Clediere et al. |
| D841,044 S | 2/2019 | van den Berg et al. |
| D841,657 S | 2/2019 | Hilhorst et al. |
| D841,660 S | 2/2019 | Mercado |
| D841,667 S | 2/2019 | Coren |
| D841,673 S | 2/2019 | Feit et al. |
| D842,871 S | 3/2019 | Clediere et al. |
| D843,383 S | 3/2019 | Phillips et al. |
| D844,649 S | 4/2019 | Bessette et al. |
| D845,971 S | 4/2019 | Tsurkan et al. |
| D845,977 S | 4/2019 | Mok et al. |
| D845,983 S | 4/2019 | Malahy et al. |
| D846,567 S | 4/2019 | Anzures et al. |
| D846,593 S | 4/2019 | Anzures et al. |
| D848,463 S | 5/2019 | Penha et al. |
| D849,015 S | 5/2019 | Kuroda et al. |
| D849,765 S | 5/2019 | Lee |
| D849,770 S | 5/2019 | Matas |
| D850,469 S | 6/2019 | Malahy et al. |
| D852,215 S | 6/2019 | Westerhold et al. |
| 10,320,734 B1 | 6/2019 | Mishra et al. |
| D854,567 S | 7/2019 | Hu et al. |
| D855,059 S | 7/2019 | Cinek et al. |
| D855,635 S | 8/2019 | Prag et al. |
| D856,347 S | 8/2019 | Cinek et al. |
| D856,357 S | 8/2019 | Naimark et al. |
| D857,038 S | 8/2019 | Phillips et al. |
| D858,546 S | 9/2019 | Haile et al. |
| D858,552 S | 9/2019 | Westerhold et al. |
| D858,555 S | 9/2019 | Krishna |
| D858,556 S | 9/2019 | Krishna |
| D859,446 S | 9/2019 | Westerhold et al. |
| D859,450 S | 9/2019 | Krishna |
| D859,452 S | 9/2019 | Markus et al. |
| D860,249 S | 9/2019 | Shriram et al. |
| D861,024 S | 9/2019 | Clediere et al. |
| D861,719 S | 10/2019 | Van Der Molen |
| D864,231 S | 10/2019 | Gupta |
| D864,991 S | 10/2019 | Seo et al. |
| D866,572 S | 11/2019 | Sagrillo et al. |
| D866,582 S | 11/2019 | Chang et al. |
| D867,382 S | 11/2019 | Wang et al. |
| D867,383 S | 11/2019 | Wang et al. |
| D868,101 S | 11/2019 | Choi et al. |
| D868,808 S | 12/2019 | Hopper et al. |
| D868,824 S | 12/2019 | Chen |
| D870,144 S | 12/2019 | Mensinger et al. |
| D870,742 S | 12/2019 | Cornell |
| D870,744 S | 12/2019 | Gaiser et al. |
| D870,761 S | 12/2019 | Le et al. |
| D871,426 S | 12/2019 | Kim |
| D871,431 S | 12/2019 | Cullum et al. |
| D872,739 S | 1/2020 | Clediere et al. |
| D874,479 S | 2/2020 | Tsurkan et al. |
| D874,496 S | 2/2020 | Jang et al. |
| D874,504 S | 2/2020 | Clediere |
| D875,113 S | 2/2020 | Cldiere |
| D875,120 S | 2/2020 | Ji et al. |
| D875,121 S | 2/2020 | Ji et al. |
| D875,122 S | 2/2020 | Ji et al. |
| D875,123 S | 2/2020 | Ji et al. |
| D875,132 S | 2/2020 | Wang et al. |
| D875,743 S | 2/2020 | Cielak et al. |
| D876,474 S | 2/2020 | Parks et al. |
| D877,185 S | 3/2020 | Cooper et al. |
| D877,750 S | 3/2020 | Stamatiou |
| D877,759 S | 3/2020 | Nishizawa et al. |
| D878,406 S | 3/2020 | Okumura et al. |
| D880,500 S | 4/2020 | Clediere |
| D882,613 S | 4/2020 | Zumbrunnen et al. |
| D882,614 S | 4/2020 | Zumbrunnen et al. |
| D882,619 S | 4/2020 | Frolovichev |
| D882,621 S | 4/2020 | Anzures et al. |
| D883,308 S | 5/2020 | Nesladek et al. |
| D884,009 S | 5/2020 | Hong et al. |
| D884,010 S | 5/2020 | Lenz, Jr. |
| D884,013 S | 5/2020 | Clediere |
| D884,721 S | 5/2020 | Lunaparra et al. |
| D884,724 S | 5/2020 | VanDuyn et al. |
| D884,727 S | 5/2020 | Tsuji et al. |
| D884,733 S | 5/2020 | Cornell |
| D885,410 S | 5/2020 | Butler |
| D885,421 S | 5/2020 | Lunaparra et al. |
| D886,121 S | 6/2020 | Zeng et al. |
| D886,135 S | 6/2020 | Cheng et al. |
| D886,142 S | 6/2020 | Lynne et al. |
| D887,428 S | 6/2020 | Fatnani et al. |
| D889,481 S | 7/2020 | Bae et al. |
| D892,142 S | 8/2020 | Clifford et al. |
| D892,820 S | 8/2020 | Jee et al. |
| D892,828 S | 8/2020 | Nesladek et al. |
| D892,847 S | 8/2020 | Lokhtin et al. |
| D893,519 S | 8/2020 | Aketa et al. |
| D893,525 S | 8/2020 | Zhang |
| D893,528 S | 8/2020 | Wang et al. |
| D893,539 S | 8/2020 | Zhang |
| D894,213 S | 8/2020 | Doti et al. |
| D894,952 S | 9/2020 | Krishna |
| D894,961 S | 9/2020 | Butler et al. |
| D898,050 S | 10/2020 | Jedrzejowicz et al. |
| D898,052 S | 10/2020 | Jang et al. |
| D899,443 S | 10/2020 | Sharp et al. |
| D910,032 S | 2/2021 | Sharp et al. |
| D912,075 S | 3/2021 | Sharp et al. |
| D920,998 S | 6/2021 | Sharp et al. |
| D920,999 S | 6/2021 | Sharp et al. |
| 2006/0287878 A1 | 12/2006 | Wadhwa et al. |

(56) References Cited

U.S. PATENT DOCUMENTS

| | | | |
|---|---|---|---|
| 2007/0005750 A1* | 1/2007 | Lunt | G06Q 10/10 709/223 |
| 2007/0094609 A1 | 4/2007 | Gilboa et al. | |
| 2008/0030496 A1* | 2/2008 | Lee | G06F 9/453 345/418 |
| 2010/0070577 A1 | 3/2010 | Relyea et al. | |
| 2010/0251141 A1* | 9/2010 | Sabin | G06F 16/958 715/758 |
| 2011/0219310 A1* | 9/2011 | Robson | G06Q 30/02 715/733 |
| 2012/0290978 A1 | 11/2012 | Devecka | |
| 2014/0040368 A1 | 2/2014 | Janssens | |
| 2014/0258260 A1 | 9/2014 | Rayborn | |
| 2014/0279066 A1* | 9/2014 | Louis | H04L 67/22 705/14.73 |
| 2014/0282099 A1* | 9/2014 | Bronder | G06F 16/54 715/753 |
| 2015/0172068 A1 | 6/2015 | Kovac | |
| 2015/0213091 A1 | 7/2015 | Laight et al. | |
| 2015/0347411 A1* | 12/2015 | Friggeri | H04L 67/20 707/728 |
| 2015/0356180 A1* | 12/2015 | Filiz | G06Q 50/01 707/734 |
| 2016/0004778 A1* | 1/2016 | Finder | G06Q 50/01 707/722 |
| 2016/0358214 A1* | 12/2016 | Shalunov | G06Q 30/0241 |
| 2018/0041461 A1 | 2/2018 | Kurani | |
| 2019/0251640 A1 | 8/2019 | Sharp et al. | |
| 2019/0392008 A1 | 12/2019 | Sharp et al. | |
| 2020/0098278 A1 | 3/2020 | Doti et al. | |

OTHER PUBLICATIONS

First Office Action Interview Summary received for U.S. Appl. No. 16/398,145 dated Apr. 20, 2020, 5 pages.

W3SCHOOLS.com, "WC.CSS Accordions", URL: retreived from https://web.archive.org/web/20160421202932/https://www.w3schools.com/w3css/w3css_accordions.asp, 2016, pp. 1-14.

International Search Report and Written Opinion received for PCT Application Serial No. PCT/US2019/029016 dated Jul. 30, 2019, 9 pages.

Sharp et al., "Landing Page for a Community-Based Dating Service", U.S. Appl. No. 29/689,783, filed May 1, 2019, 23 pages.

Sharp et al., "Presenting Matches Within a Community-Based Dating Service", U.S. Appl. No. 29/689,785, filed May 1, 2019, 32 pages.

Sharp et al., "Design for a Second-Look Interface for a Community-Based Dating Service", U.S. Appl. No. 29/689,786, filed May 1, 2019, 27 pages.

Sharp et al., "Design for a Match Pausing Interface for a Community-Based Dating Service", U.S. Appl. No. 29/689,787, filed May 1, 2019, 26 pages.

Sharp et al., "Design for a Conversation Starter Interface for a Community-Based Dating Service", U.S. Appl. No. 29/689,789, filed May 1, 2019, 27 pages.

Sharp et al., "Systems and Methods for Providing a Community-Based Dating Service for a Social Networking System", U.S. Appl. No. 16/398,148, filed Apr. 29, 2019, 84 pages.

Henri et al., "Understanding and Analysing Activity and Learning in Virtual Communities", Journal of Computer Assisted Learning, vol. 19, 2003, pp. 474-487.

International Search Report and Written Opinion received for PCT Application Serial No. PCT/US2019/029980 dated Jun. 13, 2019, 9 pages.

International Search Report and Written Opinion received for PCT Application Serial No. PCT/US2019/029987 dated Jun. 13, 2019, 9 pages.

Notice of Allowance received for U.S. Appl. No. 29/689,785 dated Jun. 16, 2020, 29 pages.

International Preliminary Report on Patentability received for PCT Application Serial No. PCT/US2019/29980 dated Nov. 3, 2020, 8 pages.

International Preliminary Report on Patentability received for PCT Application Serial No. PCT/US2019/029987 dated Nov. 3, 2020, 8 pages.

International Preliminary Report on Patentability received for PCT Application Serial No. PCT/US2019/029016 dated Nov. 3, 2020, 8 pages.

Final Office Action received for U.S. Appl. No. 16/398,145 dated Sep. 15, 2020, 69 pages.

McCorquodale, Sara "Mutual Appreciation", URL: https://www.theguardian.com/lifeandstyle/2009/jan/24/dating-hobbies-mutual-interests, The Guardian, Guide to Dating, Jan. 28, 2009, 4 pages.

Non-Final Office Action received for U.S. Appl. No. 29/689,783 dated Sep. 18, 2020, 37 pages.

Notice of Allowance received for U.S. Appl. No. 29/689,786 dated Oct. 21, 2020, 38 pages.

Notice of Allowance received for U.S. Appl. No. 29/689,787 dated Sep. 24, 2020, 42 pages.

Non-Final Office Action received for U.S. Appl. No. 29/689,789 dated Sep. 18, 2020, 34 pages.

Non-Final Office Action received for U.S. Appl. No. 16/398,145 dated Mar. 16, 2021, 83 pages.

Padhye, Sushrut, "Why You Should Integrate Social Media Platforms into Your App", URL: https://www.socialmediatoday.com/content/why-you-should-integ rate-social-media-platforms-your-app, Guide to Dating, Jan. 19, 2015, 5 pages.

Notice of Allowance received for U.S. Appl. No. 29/689,783 dated Feb. 4, 2021, 29 pages.

Notice of Allowance received for U.S. Appl. No. 29/689,789 dated Feb. 4, 2021, 31 pages.

Preinterview First Office Action received for U.S. Appl. No. 16/398,148 dated Feb. 25, 2021, 68 pages.

\* cited by examiner

SYSTEMS AND METHODS FOR FACILITATING DISCOVERY OF USERS WHO SHARE COMMON CHARACTERISTICS WITHIN A SOCIAL NETWORKING SYSTEM

CROSS REFERENCE TO RELATED APPLICATION

This application claims the benefit of U.S. Provisional Application No. 62/665,478, filed May 1, 2018, U.S. Provisional Application No. 62/720,493, filed Aug. 21, 2018, and U.S. Provisional Application No. 62/757,128, filed Nov. 7, 2018, the disclosure of each of which is incorporated, in its entirety, by this reference.

BACKGROUND

Modern social networking systems have revolutionized how people connect to and communicate with each other. For example, users of a social networking system may share information (e.g., posts, news stories, media, etc.) with other users, may join groups that include other users who share common interests, and so forth.

Unfortunately, it may be difficult for users of a social networking system to make new connections within the social networking system. For example, a user may wish to discover and/or connect with other users of a social networking system with whom he or she shares common characteristics and who are not already friends of the user. To illustrate, the user may have recently moved to a new city and may wish to discover other users of the social networking system who are also located in the new city. As another example, the user may be a participant of a dating service of the social networking system and may wish to discover other participants of the dating service.

Unfortunately, traditional options for discovery of users of social networking systems who share common attributes may be cumbersome, ineffective, and may fail to facilitate serendipitous discovery of new potential connections. For example, a user could find and/or join a group of users who share a common attribute (e.g., a common interest, a common status, a common location, etc.). However, such groups may require a user to actively seek out and/or join them in order to discover other users who are members of such groups. Additionally, such groups may omit other users who also share the same attributes, but who have not actively sought out and/or joined the group. Furthermore, traditional user searching and browsing tools may not discriminate between users who may be interested in making new connections and users who may not be interested in making new connections. Hence, the instant application identifies and addresses a need for additional systems and methods for facilitating discovery of users who share common characteristics within a social networking system.

SUMMARY

As will be described in greater detail below, the instant disclosure describes various systems and methods for facilitating discovery of users who share common characteristics within a social networking system by identifying and visually indicating, to a user who is participating in a discovery service and who possesses a desired user attribute, other users who are participating in the discovery service and who also possess the desired user attribute. For example, an embodiment may enable a user who is participating in the discovery service and a dating service to visually distinguish users of the social networking system who are participating in the discovery service and the dating service from other users of the social networking system while the user interacts with various interfaces of the social networking system. Additional examples and illustrations will be provided in the description below.

In one example, a computer-implemented method for facilitating discovery of users who share common characteristics within a social networking system may include receiving, via a social networking system, a request from a user to participate in a discovery service designed to facilitate connections between users of the social networking system who share common attributes, and obtaining, from the user, data representative of at least one desired user attribute, possessed by the user, for new user connections. The computer-implemented method may further include identifying, within the social networking system, at least one additional user who is both a participant in the discovery service and who also possesses the desired user attribute, and providing a visual indication to the user, when representing the additional user within a user interface of the social networking system, that the additional user is a participant in the discovery service and that the additional user possesses the desired user attribute.

In some examples, the visual indication may include an interface affordance associated with a profile picture of the additional user included in the user interface of the social networking system. In some additional examples, providing the visual indication to the user when representing the additional user within the user interface of the social networking system may include providing the visual indication to the user when representing the additional user within at least one of (1) a content feed interface of the social networking system, (2) a group interface of the social networking system, (3) a search interface of the social networking system, or (4) a comment interface of the social networking system.

In some embodiments, the desired user attribute may include an indication that the user is a participant in a dating service of the social networking system, and the additional user may also be a participant in the dating service of the social networking system. In some additional embodiments, identifying the additional user may include determining that the user and the additional user have at least a threshold level of compatibility within the dating service. In some examples, the computer-implemented method may further include (1) receiving a selection of the additional user from the user, and (2) presenting at least one set of information associated with the dating service and the additional user to the user in response to receiving the selection of the additional user. In at least one example, the set of information may include a dating profile of the additional user.

In at least some examples, the computer-implemented method may further include identifying a set of mutual friends of the user and the additional user and who can introduce the user to the additional user, and presenting at least a portion of the set of mutual friends to the user. In some such examples, the method may further include receiving a selection of at least one mutual friend included in the set of mutual friends from the user, and sending an introduction request to the mutual friend. In at least one example, the introduction request may include a request for the mutual friend to provide the user with an introduction to the additional user. In some embodiments, the method may further include receiving an introduction of the user to the additional user from the mutual friend in response to sending the introduction request to the mutual friend, and sending the introduction to at least one of the user or the additional user.

In some embodiments, identifying the additional user may further include determining that the additional user is excluded from a set of friends of the user and that the user is excluded from a set of friends of the additional user.

In at least some examples, the computer-implemented method may further include receiving, from the additional user, permission to indicate to users of the social networking system who are participants in the discovery service and who also possess the desired user attribute that the additional user is also a participant in the discovery service and that the additional user also possesses the desired user attribute. In such examples, identifying the additional user may be based on the permission received from the additional user.

In some embodiments, the computer-implemented method may further include (1) receiving an additional request from the user to hide the visual indication that the additional user is a participant in the discovery service and that the additional user possesses the desired user attribute, and (2) hiding the visual indication in response to receiving the additional request.

In addition, a corresponding system for facilitating discovery of users who share common characteristics within a social networking system may include several modules stored in memory. In some examples, the system may include a receiving module that receives, via a social networking system, a request from a user to participate in a discovery service designed to facilitate connections between users of the social networking system who share common attributes. The system may further include an obtaining module that obtains, from the user, data representative of at least one desired user attribute, possessed by the user, for new user connections. The system may also include an identifying module that identifies, within the social networking system, at least one additional user who is both a participant in the discovery service and who also possesses the desired user attribute. Additionally, the system may further include a providing module that provides a visual indication to the user, when representing the additional user within a user interface of the social networking system, that the additional user is a participant in the discovery service and that the additional user possesses the desired user attribute. The system may further include at least one physical processor that executes the receiving module, the obtaining module, the identifying module, and the providing module.

In some embodiments, the desired user attribute may include an indication that the user is a participant in a dating service of the social networking system, and the additional user may also be a participant in the dating service of the social networking system. In some embodiments, the identifying module may further identify the additional user by determining that the user and the additional user have at least a threshold level of compatibility within the dating service. In some examples, the receiving module may further receive a selection of the additional user from the user, and the providing module may further present at least one set of information associated with the dating service and the additional user to the user in response to receiving the selection of the additional user.

In some examples, the identifying module may further identify a set of mutual friends of the user and the additional user and who can introduce the user to the additional user. The providing module may further present at least a portion of the set of mutual friends to the user. In further examples, the receiving module may receive a selection of at least one mutual friend included in the set of mutual friends from the user. In some embodiments, the system may further include a sending module, stored in memory, that sends an introduction request to the mutual friend. In some examples, the introduction request may include a request for the mutual friend to provide the user with an introduction to the additional user. In additional embodiments, the physical processor may further execute the sending module.

In some embodiments, the receiving module may further receive an introduction of the user to the additional user from the mutual friend in response to the sending module sending the introduction request to the mutual friend, and the sending module may further send the introduction to at least one of the user or the additional user.

In some examples, the above-described method may be encoded as computer-readable instructions on a computer-readable medium. For example, a computer-readable medium may include one or more computer-executable instructions that, when executed by at least one processor of a computing system, may cause the computing system to receive, via a social networking system, a request from a user to participate in a discovery service designed to facilitate connections between users of the social networking system who share common attributes, and may cause the computing system to obtain, from the user, data representative of at least one desired user attribute, possessed by the user, for new user connections.

Additionally, the computer-readable medium may further include one or more computer-executable instructions that, when executed by the processor of the computing system, may cause the computing system to identify, within the social networking system, at least one additional user who is both a participant in the discovery service and who also possesses the desired user attribute, and may cause the computing system. In some examples, the computer-readable medium may further include one or more computer-executable instructions that, when executed by the processor of a computing system, may cause the computing system to provide a visual indication to the user, when representing the additional user within a user interface of the social networking system, that the additional user is a participant in the discovery service and that the additional user possesses the desired user attribute.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
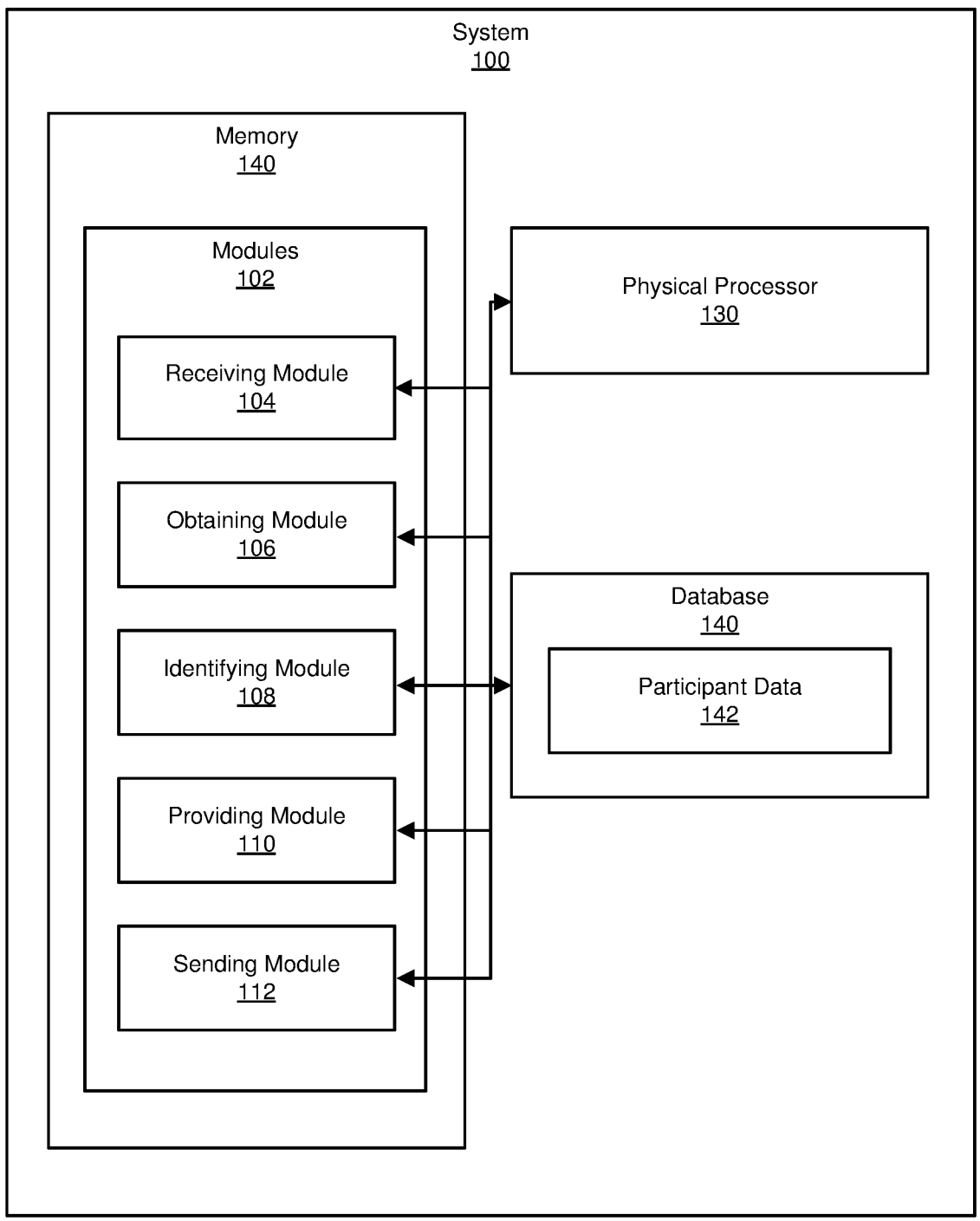
FIG. 1 is a block diagram of an example system for facilitating discovery of users who share common characteristics within a social networking system.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims

DETAILED DESCRIPTION OF EXEMPLARY EMBODIMENTS

The present disclosure is generally directed to systems and methods for facilitating discovery of users who share common characteristics within a social networking system. As will be explained in greater detail below, embodiments of the instant disclosure may receive, via a social networking system, a request from a user to participate in a discovery service designed to facilitate connections between users of the social networking system who share common attributes. An embodiment may also obtain, from the user, data representative of at least one desired user attribute, possessed by the user, for a new user connection. An embodiment may also identify at least one additional user who is both a participant in the discovery service and who also possesses the desired user attribute. An embodiment may also provide a visual indication, when representing the additional user within a user interface of the social networking system, that the additional user is a participant in the discovery service and that the additional user possesses the desired user attribute.

For example, an embodiment may receive, from a user of a social networking system, a request to participate in a discovery service of the social networking system that is designed to facilitate connections between users who share common attributes. The embodiment may also obtain, from the user, a desired user attribute that may include an indication that the user is a participant in a dating service of the social networking system and that the user wishes to discover other users of the social networking system who are also participants in the dating service. The embodiment may then identify an additional user who is both a participant in the discovery service and who is also a participant in the dating service. Finally, the embodiment may then provide a visual indication, when representing the additional user within a content feed interface of the social networking system, that the additional user is a participant of the discovery service and that the additional user is also a participant of the dating service. In some examples, the visual indication may include an interface affordance associated with a profile picture of the additional user.

By providing such a visual indication, the systems and methods described herein may enable a user to readily distinguish, within various interfaces of the social networking system, users of the social networking system who (1) are participating in the discovery service, and (2) possess the desired user attribute. Additional embodiments may also enable the user to send an introduction request to a mutual friend (e.g., a friend within the social networking system that is shared by the user and the additional user), and may enable the mutual friend to provide a requested introduction. Therefore, the systems and methods described herein may enable serendipitous discovery of users who share desired user attributes, and may further improve the quality and/or quantity of new connections the participant may establish with other participants in the discovery service of the social networking system.

Additionally, embodiments of the instant disclosure may provide for a more efficient usage of telecommunications resources (e.g., bandwidth) than traditional methods of making connections within a social networking system. For example, the systems and methods described herein may enable a participant to distinguish (e.g., visually distinguish) users of a social networking system who may be potential connections (e.g., users who are participants in a discovery service and who possess a desired user attribute) from users who may not be potential connections, without requiring the user to access and/or download any additional information and/or interfaces. Thus, the participant may discover potential connections by accessing profile information associated with recommended potential connections instead of randomly browsing profile information associated with a potentially larger, less targeted group of other participants. This may conserve bandwidth resources of the participant, the social networking system, and/or the dating service.

The following will provide, with reference to FIGS. 1-2 and 4-11, detailed descriptions of systems for facilitating discovery of users who share common characteristics within a social networking system. Detailed descriptions of corresponding computer-implemented methods will also be provided in connection with FIG. 3.

FIG. 1 is a block diagram of an example system 100 for facilitating discovery of users who share common characteristics within a social networking system. As illustrated in this figure, example system 100 may include one or more modules 102 for performing one or more tasks. As will be explained in greater detail below, modules 102 may include a receiving module 104 that receives, via a social networking system, a request from a user to participate in a discovery service designed to facilitate connections between users of the social networking system who share common attributes.

As further illustrated in FIG. 1, example system 100 may also include an obtaining module 106 that obtains, from the user, data representative of at least one desired user attribute, possessed by the user, for new user connections. Example system 100 may additionally include an identifying module 108 that identifies, within the social networking system, at least one additional user who is both a participant in the discovery service and who also possesses the desired user attribute. Additionally, example system 100 may also include a providing module 110 that provides a visual indication to the user, when representing the additional user within a user interface of the social networking system, that the additional user is a participant in the discovery service and that the additional user possesses the desired user attribute.

In some embodiments, example system 100 may also include a sending module 112 that sends an introduction request to a mutual friend of the user and the additional user. In some examples, the introduction request may include a request for the mutual friend to provide the user with an introduction to the additional user.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate facilitating discovery of users who share common characteristics within a social networking system. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, example system 100 may also include one or more databases, such as database 140. In at least one example, database 140 may include participant data 142 that may include information associated with users who are participating in a discovery service of the social networking system. Database 140 may represent portions of a single database or computing device or a plurality of databases or computing devices. In some embodiments, database 140 may be a logical container for data and may be implemented in various forms (e.g., a database, a file, a data structure, etc.). Examples of database 140 may include databases or database management systems such as a relational database, an operational data store (ODS), a NoSQL database, a NewSQL database, and/or any other suitable organized collection of data.

Figure 2:
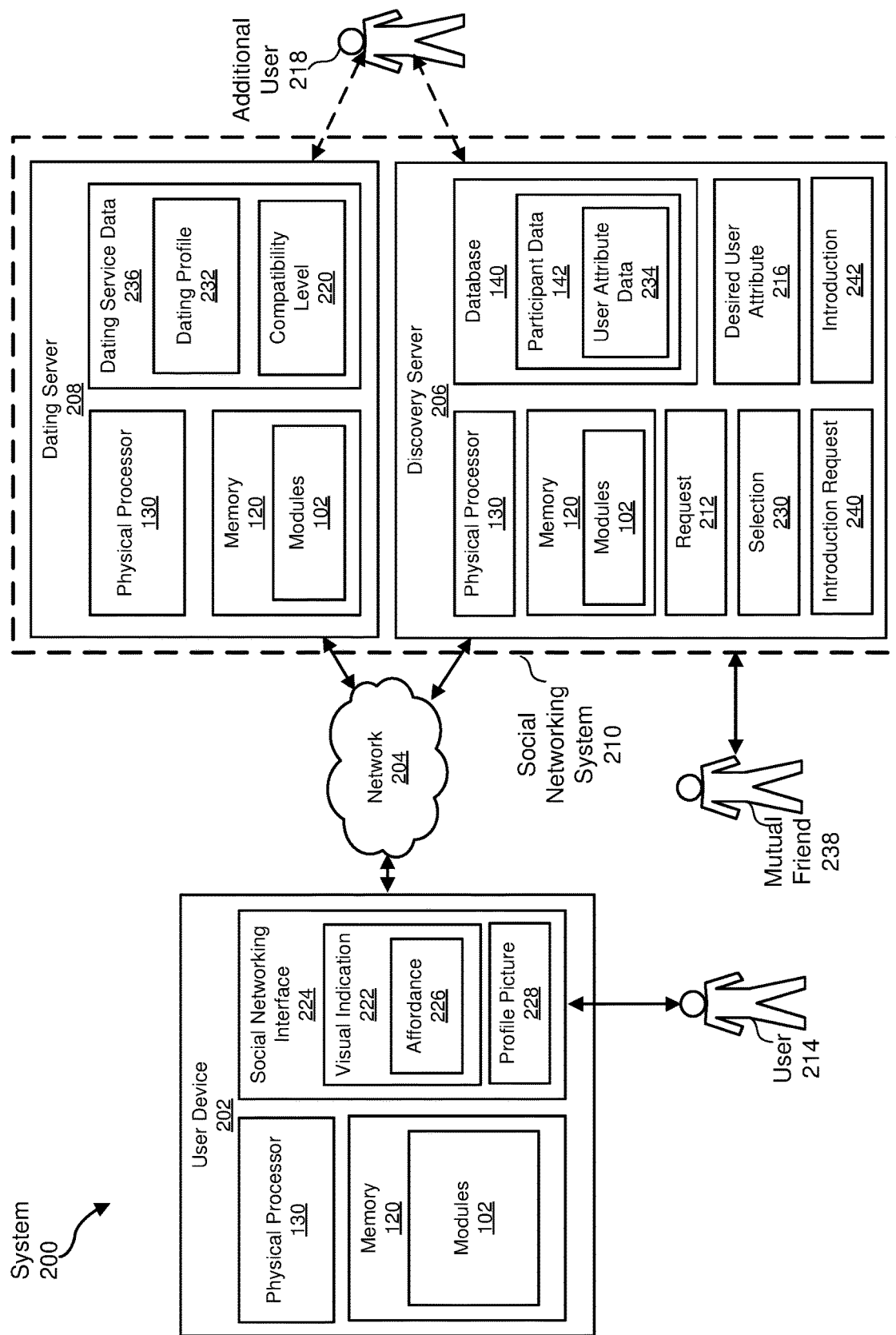
FIG. 2 is a block diagram of an example implementation of a system for facilitating discovery of users who share common characteristics within a social networking system.

Example system 100 in FIG. 1 may be implemented in a variety of ways. For example, all or a portion of example system 100 may represent portions of an example system 200 ("system 200") in FIG. 2. As shown in FIG. 2, system 200 may include user device 202 in communication with discovery service server 206 ("discovery server 206") and dating service server 208 ("dating server 208") via network 204. In at least one example, user device 202 may be programmed with one or more of modules 102. Additionally or alternatively, discovery server 206 and/or dating server 208 may be programmed with one or more of modules 102.

In at least one embodiment, one or more modules 102 from FIG. 1 may, when executed by user device 202, discovery server 206, and/or dating server 208, enable user device 202, discovery server 206, and/or dating server 208 to perform one or more operations to facilitate discovery of users who share common characteristics within a social networking system. For example, as will be described in greater detail below, receiving module 104 may receive, via a social networking system (e.g., social networking system 210), a request (e.g., request 212) from a user (e.g., user 214) to participate in a discovery service designed to facilitate connections between users of the social networking system who share common attributes. Additionally, obtaining module 106 may obtain, from the user, data representative of at least one desired user attribute (e.g., desired user attribute 216), possessed by the user, for new user connections. In some examples, the desired user attribute may include an indication that the user may be a participant in a dating service of the social networking system.

In some examples, identifying module 108 may identify, within the social networking system, at least one additional user (e.g., additional user 218) who is both a participant in the discovery service and who also possesses the desired user attribute. In some examples, the additional user may also be a participant in the dating service of the social networking system. In further examples, identifying module 108 may identify the additional user by determining that the user and the additional user have at least a threshold level of compatibility (e.g., compatibility level 220 included in dating service data 236) within the dating service. In at least one example, identifying module 108 may further identify the additional user by determining that the additional user is excluded from a set of friends of the user and that the user is excluded from a set of friends of the additional user.

In some embodiments, providing module 110 may provide a visual indication (e.g., visual indication 222) to the user, when representing the additional user within a user interface (e.g., social networking interface 224) of the social networking system, that the additional user is a participant in the discovery service and that the additional user possesses the desired user attribute. In at least one embodiment, the visual indication may include an interface affordance (e.g., affordance 226) associated with a profile picture (e.g., profile picture 228) of the additional user included in the user interface of the social networking system. In some embodiments, providing module 110 may provide the visual indication to the user when representing the additional user within the user interface of the social networking system by providing the visual indication to the user when representing the additional user within at least one of (1) a content feed interface of the social networking system, (2) a group interface of the social networking system, (3) a search interface of the social networking system, or (4) a comment interface of the social networking system.

In at least one example, receiving module 104 may also receive a selection (e.g., selection 230) of the additional user from the user, and providing module 110 may further present at least one set of information associated with the dating service and the additional user (e.g., any information included in dating service data 236 that may be associated with the additional user) in response to receiving the selection of the additional user. In some examples, the set of information may include a dating profile (e.g., dating profile 232 included in dating service data 236) of the additional user.

In at least one example, identifying module 108 may further identify (e.g., from user attribute data 234 included in participant data 142) a set of mutual friends of the user and the additional user. Providing module 110 may then present at least a portion of the set of mutual friends to the user (e.g., via social networking interface 224). Receiving module 104 may then receive a selection of at least one mutual friend (e.g., mutual friend 238) included in the set of mutual friends from the user, and sending module 112 may send an introduction request (e.g., introduction request 240) to the mutual friend that includes a request for the mutual friend to provide the user with an introduction to the additional user. In some examples, receiving module 104 may further receive an introduction (e.g., introduction 242) of the user to the additional user from the mutual friend in response to sending module 112 sending the introduction request to the mutual friend, and sending module 112 may further send the introduction to the user and/or the additional user.

User device 202 generally represents any type or form of computing device capable of reading and/or executing computer-executable instructions. In at least one embodiment, user device 202 may accept one or more directions from discovery server 206 and/or dating server 208. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between user device 202, discovery server 206, and/or dating server 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, and the like. Network 204 may facilitate communication or data transfer using wireless or wired connections. In one embodiment, network 204 may facilitate communication between user device 202, discovery server 206, and dating server 208.

Discovery server 206 generally represents any type or form of computing device capable of reading and/or executing computer-executable instructions and/or hosting executables. Examples of discovery server 206 include, without limitation, application servers, storage servers, database servers, web servers, and/or any other suitable computing device configured to run certain software applications and/or provide various application, storage, and/or database services. In some examples, discovery server 206 may provide a discovery service that facilitates discovery of users who share common characteristics within a social networking system (e.g., social networking system 210).

Like discovery server 206, dating server 208 generally represents any type or form of computing device capable of reading and/or executing computer-executable instructions and/or hosting executables. Examples of dating server 208 include, without limitation, application servers, storage servers, database servers, web servers, and/or any other suitable computing device configured to run certain software applications and/or provide various application, storage, and/or database services. In some examples, dating server 208 may provide a dating service within a social networking system (e.g., social networking system 210) that enables users of the social networking system to make dating connections within the social networking system. In some examples, a "dating service" or "dating service within a social networking system" may be any service of a social networking system that manages dating connections and/or shares, compiles, formats, and/or broadcasts information based on dating connections. In some examples, a "dating connection" and "a connection within a dating service" may be any social connection between at least two participants of a dating service of a social networking system that represents an interest by at least one of the participants in engaging in dating practices with the other participant or participants. In some examples, dating server 208 may include (e.g., store, maintain, provide access to, etc.) dating service data 236 associated with the dating service. In some examples, dating service data 236 may include, without limitation, compatibility level 220 and/or dating profile 232.

In at least one example, user device 202, discovery server 206, and dating server 208 may be computing devices programmed with one or more of modules 102. All or a portion of the functionality of modules 102 may be performed by user device 202, discovery server 206, dating server 208, and/or any other suitable computing system. As will be described in greater detail below, one or more of modules 102 from FIG. 1 may, when executed by at least one processor of user device 202, discovery server 206, and/or dating server 208, may enable user device 202, discovery server 206, and/or dating server 208 to facilitate discovery of users who share common characteristics within a social networking system.

Social networking system 210 may include any computing device and/or devices, software framework, and/or combination thereof usable for providing and/or hosting a service (e.g., via the Internet). In some examples, the phrase "social networking system" may refer to a computing platform that provides a social networking service. In some examples, a "social networking service" may refer to any service and/or Internet site that manages social connections and/or shares, compiles, formats, and/or broadcasts information based on social connections. In additional examples, a "friend" may be any social connection maintained by the social networking system between two users of the social networking system.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
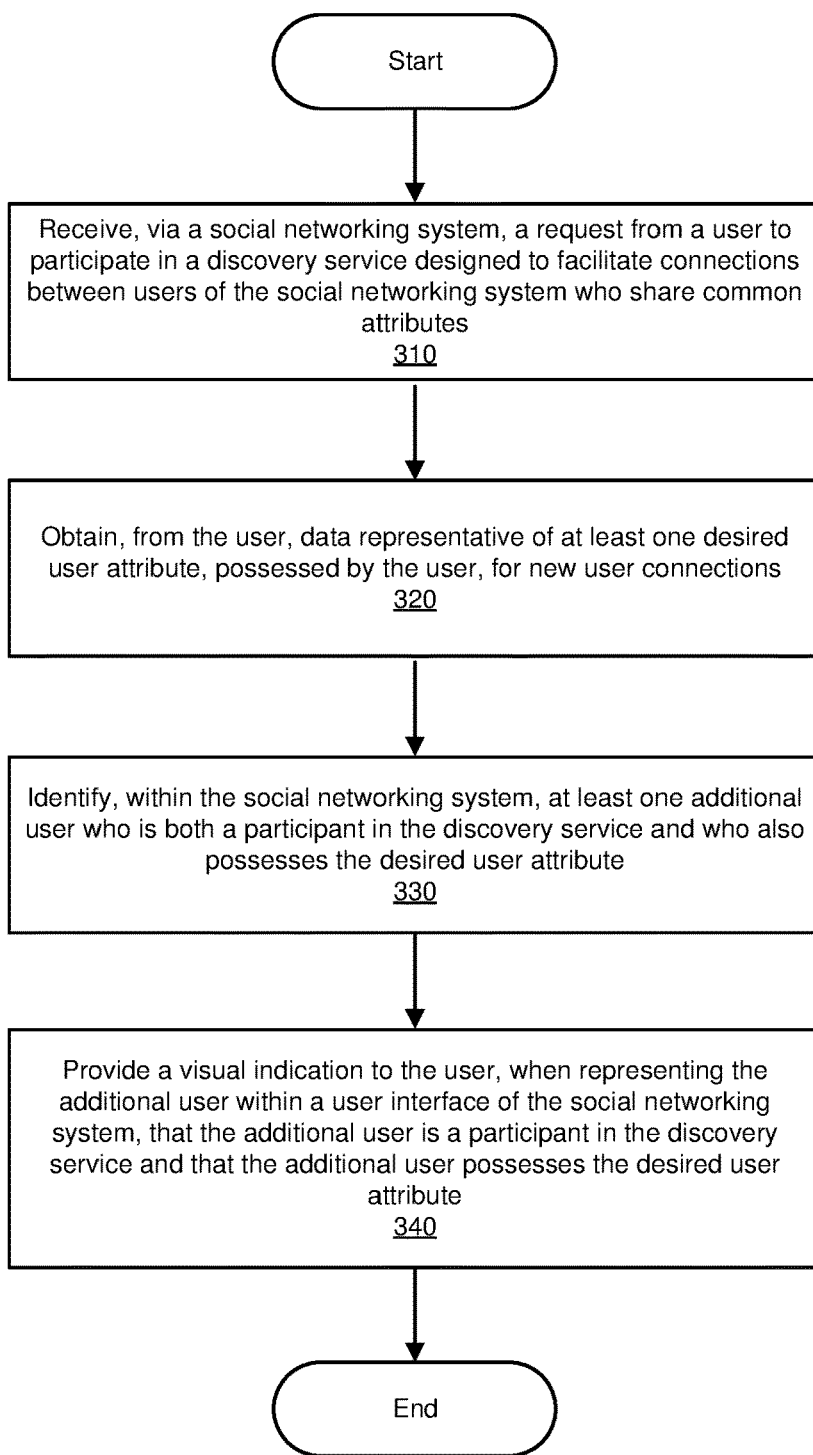
FIG. 3 is a flow diagram of an example method for facilitating discovery of users who share common characteristics within a social networking system.

FIG. 3 is a flow diagram of an example computer-implemented method 300 for facilitating discovery of users who share common characteristics within a social networking system. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive, via a social networking system, a request from a user to participate in a discovery service designed to facilitate connections between users of the social networking system who share common attributes. For example, receiving module 104 may, as part of user device 202, discovery server 206, and/or dating server 208 in FIG. 2, receive, via social networking system 210, request 212 from user 214 to participate in a discovery service designed to facilitate connections between users of the social networking system who share common attributes.

In some examples, a "request" may include any information that indicates that a user (e.g., user 214) of a social networking system (e.g., social networking system 210) desires to participate in a discovery service designed to facilitate connections between users of the social networking system (e.g., user 214 and additional user 218) who share common attributes. For example, a request (e.g., request 212) may include an instruction for one or more of the systems described herein to provide an indication to other participants of the discovery service that user 214 desires to establish connections with other participants of the discovery service. In some examples, a request (e.g., request 212) may further include, without limitation, a message from the participant to other participants of the discovery service, a set attributes of the user, at least one desired user attribute, possessed by the user, for new user connections, and so forth.

Receiving module 104 may receive, via social networking system 210, request 212 from user 214 in any suitable way. For example, user 214 may submit a request to participate in the discovery service via a user interface of social networking system 210 (e.g., social networking interface 224). Receiving module 104 may then receive request 212 from the user interface via an internal messaging service of social networking system 210 that facilitates communication among various services and/or modules of social networking system 210.

Returning to FIG. 3, at step 320, one or more of the systems described herein may obtain, from the user, data representative of at least one desired user attribute, possessed by the user, for new user connections. For example, obtaining module 106 may, as part of user device 202, discovery server 206, and/or dating server 208 in FIG. 2, obtain, from user 214, desired user attribute 216, for new user connections.

In some examples, a "user attribute" may be any quality or characteristic that may be associated with a user. In some examples, a user attribute may include, without limitation, a characteristic (e.g., physical, mental, intellectual, etc.), a trait, an aspect, a property, and/or a state. For example, desired user attribute 216 may include an indication that user 214 is located in a particular geographic area and wishes to connect with other users in the particular geographic area, an indication that user 214 is employed by a particular employer and wishes to connect with other users who are also employed by the particular employer, an indication that user 214 is a participant of a dating service of social networking system 210 and wishes to connect with other users who are also participants of the dating service, and so forth.

Obtaining module 106 may obtain desired user attribute 216 from user 214 in any suitable way. For example, user 214 may submit desired user attribute 216 via a user interface of social networking system 210 (e.g., social networking interface 224). Obtaining module 106 may then obtain desired user attribute 216 from the user interface via an internal messaging service of social networking system 210 that facilitates communication among various services, modules, and/or users of social networking system 210. As noted above, in some examples, desired user attribute 216 may be included with (e.g., incorporated as part of, communicated to obtaining module 106 contemporaneously with, etc.) request 212.

Returning to FIG. 3, at step 330, one or more of the systems described herein may identify, within the social networking system, at least one additional user who is both a participant in the discovery service and who also possesses the desired user attribute. For example, identifying module 108 may, as part of user device 202, discovery server 206, and/or dating server 208 in FIG. 2, identify, within social networking system 210, additional user 218 who is both a participant in the discovery service and who also possesses desired user attribute 216.

Identifying module 108 may identify additional user 218 who is both a participant in the discovery service and who also possesses desired user attribute 216 in a variety of contexts. For example, identifying module 108 may identify additional user 218 by accessing user attribute data 234 included in participant data 142 stored in database 140. Identifying module 108 may then determine that additional user 218 is a participant of the discovery service and that additional user 218 possesses the desired user attribute based on user attribute data 234. Identifying module 108 may then identify additional user 218 based on that determination.

For example, user 214 may be a participant in the discovery service, and may be geographically located in Palo Alto, Calif. Desired user attribute 216 may indicate that user 214 desires to connect with other users who are also located in Palo Alto, Calif. User attribute data 234 may indicate that additional user 218 is also a participant in the discovery service and that additional user 218 is geographically located in Palo Alto, Calif. Identifying module 108 may access participant data 142, determine that additional user 218 is both a participant of the discovery service and that additional user 218 possesses the desired user attribute of being geographically located in Palo Alto, Calif. based on user attribute data 234, and identify additional user 218 based on that determination.

As mentioned above, in some examples, desired user attribute 216 may include an indication that user 214 is a participant in a dating service of social networking system 210, and additional user 218 may also be a participant in the dating service of social networking system 210. In such examples, identifying module 108 may identify additional user 218 by determining that user 214 and additional user 218 have at least a threshold level of compatibility within the dating service.

In some examples, a "level of compatibility" and/or "compatibility level" may include any metric that may indicate a degree to which two participants of a dating service may be romantically compatible with each other. A level of compatibility may be determined based on any suitable criteria including, without limitation, common attributes (e.g., income, socioeconomic status, religious views, etc.) of user 214 and additional user 218, previous dating experiences of user 214 and/or additional user 218, previous relationships of user 214 and/or additional user 218, and so forth.

For example, a threshold level of compatibility may be 10 compatibility points. User 214 and additional user 218 may both be participants of the dating service and may share a particular attribute that may correlate with romantic compatibility, such as a set of common religious views. Based on user 214 and additional user 218 sharing this common attribute, the dating service may assign user 214 and additional user 218 a compatibility level 220 of 10 compatibility points, and may store compatibility level 220 as part of dating service data 236. In this example, identifying module 108 may identify additional user 218 by accessing compatibility level 220 included in dating service data 236, and determining that compatibility level 220, at 10 compatibility points, meets or exceeds the threshold level of compatibility of 10 compatibility points. Therefore, identifying module 108 may identify additional user 218 by determining that user 214 and additional user 218 have at least the threshold level of compatibility within the dating service.

In some contexts, identifying module 108 may identify the additional user (e.g., additional user 218) by determining that the additional user is excluded from a set of friends of the user (e.g., user 214) and/or that the user (e.g., user 214) is excluded from a set of friends of the additional user. In at least this way, the systems and methods described herein may limit identifying module 108 to identifying (e.g., as potential connections) to users who are not already friends of user 214 and/or who are not already friends with user 214. Thus, the systems and methods described herein may present a visual indication, when representing additional user 218 user within a user interface of the social networking system, that additional user 218 is a participant in the discovery service and that additional user 218 possesses the desired user attribute when additional user 218 may not already be a friend of user 214 and/or user 214 may not already be a friend of additional user 218.

In some circumstances, a user of a discovery service may wish to limit the scope, level, and/or quantity of his or her participation in the discovery service, and/or may wish to "opt in to" or "opt out of" of particular discovery experiences facilitated by the systems and methods described herein. For at least this reason, in at least one embodiment, one or more of the systems described herein (e.g., receiving module 104) may receive, from an additional user (e.g., additional user 218), permission to indicate to users of the social networking system who are participants in the discovery service and who also possess the desired user attribute that the additional user is also a participant in the discovery service and that the additional user also possesses the desired user attribute. In such examples, identifying module 108 may identify the additional user based on the permission received from the additional user.

One or more of modules 102 (e.g., receiving module 104, obtaining module 106, etc.) may receive such permission from additional user 218 in a variety of contexts. For example, one or more modules 102 (e.g., providing module 110) may provide a user interface of social networking system 210 to additional user 218 that may enable additional user 218 to select a set of user attributes that he or she wishes to be identifiable as possessing. Additional user 218 may use the provided user interface to send data (e.g., via network 204 and/or a suitable internal messaging system of social networking system 210) indicating that he or she grants permission for one or more of the systems described herein to indicate that he or she possesses the selected user attributes to other users. One or more of modules 102 (e.g., receiving module 104) may receive the data indicating the granted permission, and may store the permission as part of user attribute data 234. Identifying module 108 may therefore, upon accessing and/or analyzing user attribute data 234 in any of the ways described herein, identify additional user 218 based on the permission received from additional user 218.

To illustrate, additional user 218 may be a participant in the discovery service and may be an employee of Company A. Additional user 218 may also want to make new connections with other employees of Company A, so additional user 218 may grant, via a suitable user interface, and one or more of the systems described herein may receive (e.g., via receiving module 104), permission for one or more of the systems described herein to indicate to users of the social networking system who are participants in the discovery service and who are also employees of Company A that additional user 218 is also an employee of Company A. Identifying module 108 may then identify additional user 218 based on this permission received from additional user 218.

As another illustration, additional user 218 may be a participant in the discovery service and may be geographically located in Palo Alto, Calif. However, additional user 218 may not want to make new connections with other users in Palo Alto, Calif., and/or may not wish to share with other participants in the discovery service that he or she may be geographically located in Palo Alto, Calif. Therefore, additional user 218 may indicate, via a suitable user interface, that he or she does not grant permission for one or more of the systems described herein to indicate to users of the social networking system who are participants in the discovery service and who are also geographically located in Palo Alto, Calif. that additional user 218 is also geographically located in Palo Alto, Calif. Thus, when user 214 indicates that he or she wishes to discover other users located in Palo Alto, Calif., embodiments of the systems described herein (e.g., identifying module 108, providing module 110, etc.) may not identify additional user 218 and/or may not provide a visual indication that additional user 218 possesses the desired user attribute of being geographically located in Palo Alto, Calif.

Returning to FIG. 3, at step 340, one or more of the systems described herein may provide a visual indication to a user, when representing an additional user within a user interface of a social networking system, that the additional user is a participant in a discovery service and that the additional user possesses a desired user attribute. For example, providing module 110 may, as part of user device 202, discovery server 206, and/or dating server 208 in FIG. 2, provide visual indication 222 to user 214 that visually indicates, when representing additional user 218 within social networking interface 224, that additional user 218 is a participant in the discovery service and that additional user 218 possesses desired user attribute 216.

Providing module 110 may provide visual indication 222 to user 214 in a variety of contexts. For example, as will be described and illustrated in greater detail below in reference to FIGS. 4-7, providing module 110 may provide visual indication 222 to user 214 when representing additional user 218 within at least one of (1) a content feed interface of social networking system 210, (2) a group interface of social networking system, (3) a search interface of the social networking system, or (4) a comment interface of the social networking system. In at least some examples, visual indication 222 may include an interface affordance (e.g., affordance 226) associated with a profile picture of the additional user included in the user interface of the social networking system.

In some examples, an "interface affordance" may include any interface element that indicates a quality or utility of an associated interface object to a user of the interface (e.g., user 214). For example, as a user of a social networking system (e.g., user 214) interacts with an interface of the social networking system (e.g., social networking interface 224), the interface may present an interface affordance that may be associated with a profile picture of an additional user of the social networking system (e.g., additional user 218). In such examples, the interface affordance may indicate to the user that, if the user interacts with the interface affordance, that the user may access a specific set of data associated with the additional user, such as a specialized profile, a set of images, an additional profile picture, a connection interface, and so forth.

By way of illustration, FIGS. 4-7 show interface views that illustrate various examples of an example system (e.g., system 200 in FIG. 2) providing a visual indication (e.g., visual indication 222), when representing an additional user (e.g., additional user 218) within an interface (e.g., social networking interface 224) of a social networking system (e.g., social networking system 210), that the additional user is a participant in a discovery service and that the additional user possesses a desired user attribute (e.g., desired user attribute 216). In these examples, the desired user attribute (e.g., desired user attribute 216) may include an indication that the user is a participant in a dating service of the social networking system, and/or that the user and the additional user have at least a threshold level of compatibility within the dating service.

Figure 4:
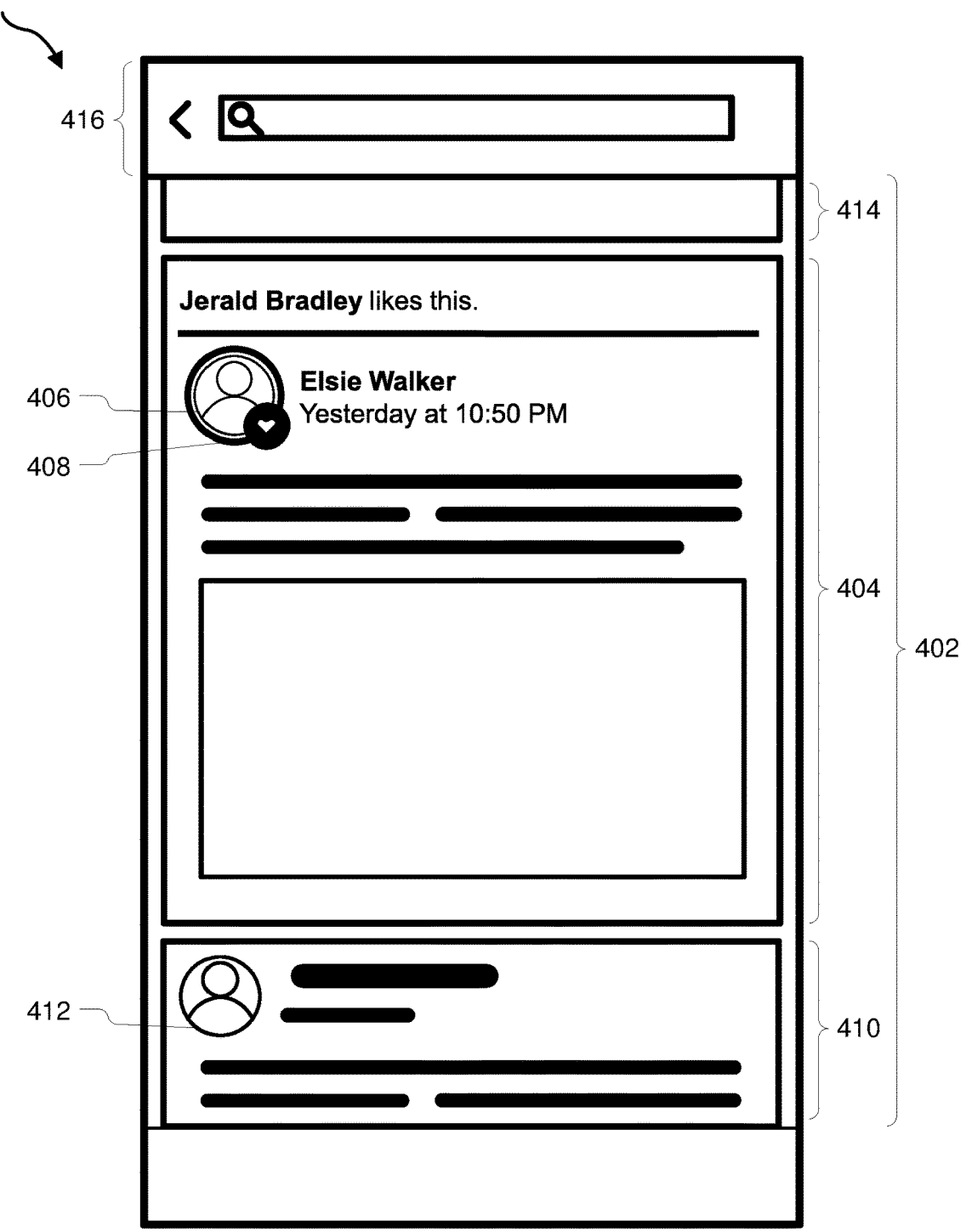
FIGS. 4-7 include interface views that illustrate various examples of example systems providing a visual indication, when representing a user within a user interface of a social networking system, that the user is a participant in a discovery service and that the user possesses a desired user attribute.

FIG. 4 shows an example interface view 400 that includes a content feed 402 of social networking system 210 that social networking system 210 may generate and show to user 214. Content feed 402 may include one or more news stories, media items, postings, and so forth that friends of user 214 have shared via social networking system 210. Content feed 402 may include a posting 404, which may be a news story shared within social networking system 210 by user Elsie Walker. Posting 404 includes a profile picture 406 of user Elsie Walker.

Interface view 400 further includes affordance 408 surrounding and/or visually associated with profile picture 406. Affordance 408 may be any interface affordance associated with a representation of a user of the social networking system (e.g., a profile picture, such as profile picture 228 in FIG. 2) that indicates to a user of interface view 400 (e.g., user 214) that the represented user is participating in both a discovery service of social networking system 210 and a dating service of social networking system 210. In interface view 400, affordance 408 includes a defined ring surrounding profile picture 406, as well as a heart-shaped icon associated with profile picture 406. Hence, as shown, affordance 408 may indicate that user Elsie Walker is participating in both a discovery service of social networking system 210 and a dating service of the social networking system. Additionally, in some examples, affordance 408 may indicate that the user to whom interface view 400 is presented (e.g., user 214) and user Elsie Walker may have at least a threshold level of compatibility within the dating service. Therefore, by viewing interface view 400, user 214 may readily identify user Elsie Walker as a potential connection (e.g., a potential dating connection).

Conversely, interface view 400 further includes posting 410, which may be a posting (e.g., a news story, a media item, a status update, etc.) posted by another user of the social networking system who is not participating in the discovery service and/or the dating service. Hence, profile picture 412, associated with the user who posted posting 410, does not include an affordance (e.g., an affordance similar to affordance 408) that indicates that the user is participating in the discovery service and the dating service. Alternatively, the absence of an affordance associated with profile picture 412 may indicate that, although the user who posted posting 410 may be participating in the discovery service and the dating service, a compatibility level (e.g., compatibility level 220) of user 214 and the user who posted posting 410 may not meet a threshold level of compatibility. Thus, by viewing interface 400, user 214 may readily distinguish user Elsie Walker, who may be a potential connection for user 214, from the author of posting 410, who may not wish to connect with user 214 and/or may not share a desired user attribute with user 214.

Interface view 400 further includes a partially displayed posting 414 and additional elements 416 that may include navigational and/or search elements that may be part of social networking interface 224 and/or a discovery service of social networking system 210.

While interface view 400 shows a content feed interface of the social networking system, providing module 110 may apply visual indicators similar to affordance 408 to representations of users within any other interface of the social networking system that may show representations of users of the social networking system to user 214. For example, providing module 110 may apply visual indicators similar to affordance 408 to representations of users in a group interface (e.g., representations of group members who are participating in the discovery service and who have the desired user attribute may include visual indicators like affordance 408), search results (e.g., representations of users who appear in search results presented to user 214 who are also participating in the discovery service and who also possess the desired user attribute, may include visual indicators like affordance 408), comment threading interfaces (e.g., representations of users who create and/or submit a particular comment who are also participating in the discovery service and who possess the desired user attribute may include visual indicators like affordance 408), and so forth.

Figure 5:
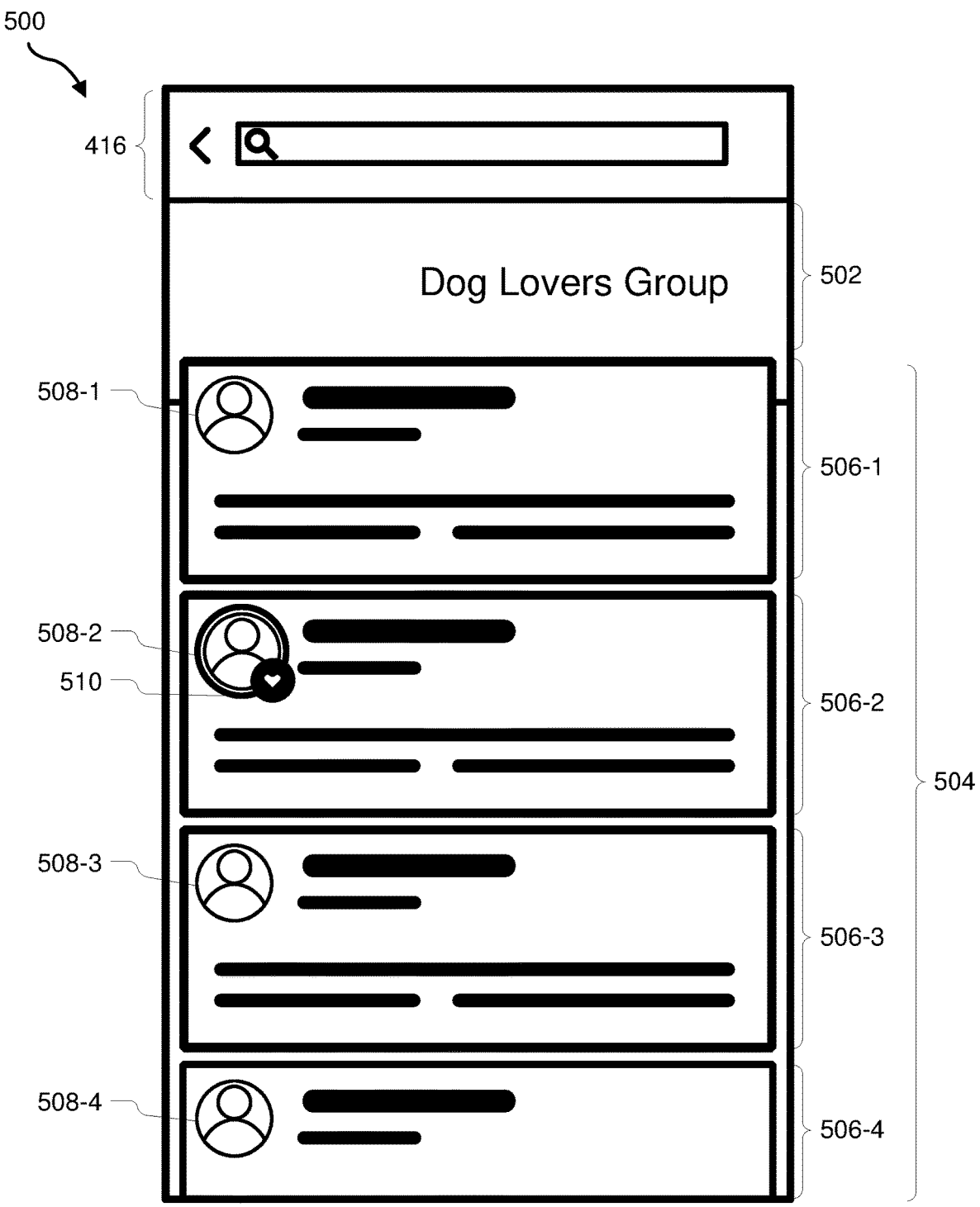

By way of example, FIG. 5 shows an example interface view 500. As shown, interface view 500 includes a group interface of social networking system 210 that shows members of a group that social networking system 210 may facilitate. Group title 502 indicates a title of the group (e.g., "Dog Lovers Group"), and list 504 indicates at least a portion of a list of the members included in the group (e.g., users of social networking system 210 who have joined and/or been admitted to the group). List 504 includes a plurality of records 506 (e.g., records 506-1 through 506-4) associated with members of the group. Each member of the group may be a user of social networking system 210, and each record 506 may be associated with a different member of the group.

As shown, each record 506 includes a profile picture 508 (e.g., profile pictures 508-1 through 508-4) that may be associated with a user associated with the respective record 506. Additionally, profile picture 508-2, included in record 506-2, is surrounded by and/or visually associated with an affordance 510. Like affordance 408, affordance 510 may visually indicate that the user associated with record 506-2 is both (1) a participant in a discovery service of social networking system 210, and (2) in possession of a desired user attribute of being a participant in a dating service of social networking system 210. Thus, record 506-2 may be visually distinct from record 506-1, record 506-3, and record 506-4 due to the inclusion of affordance 510. A user who views interface view 500 (e.g., user 214) may therefore readily identify the user associated with record 506-2 as a potential connection.

Figure 6:
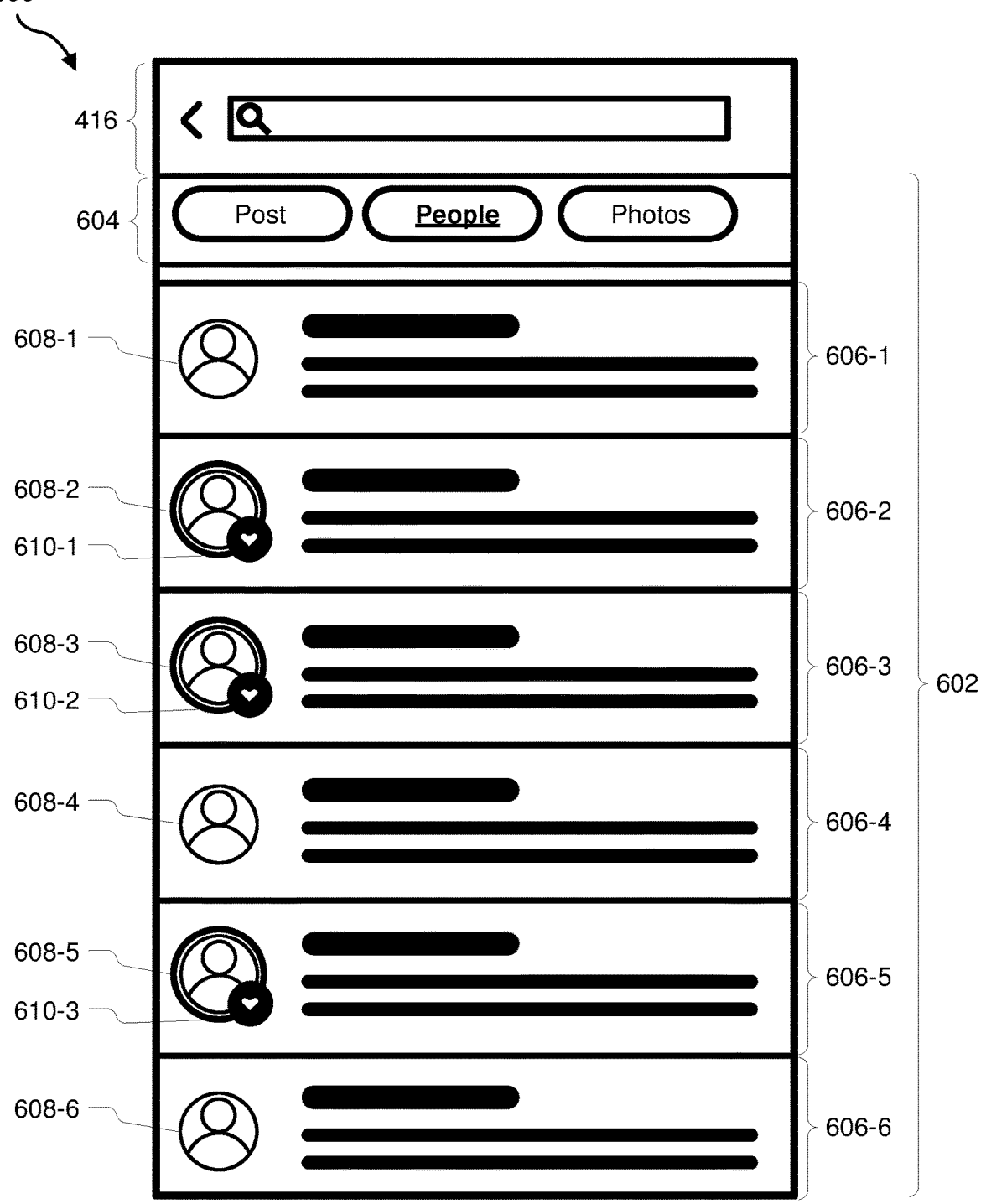

As another example, FIG. 6 shows an interface view 600. As shown, interface view 600 includes a search interface 602 of social networking system 210. Search interface 602 includes a switchable indicator 604 that indicates that search interface 602 is configured to search for people (e.g., "People" is highlighted), but may also be configured to search for posts or photos (e.g., by user 214 selecting either "Post" or "Photos").

Search interface 602 also includes a plurality of search results 606 (e.g., search results 606-1 through 606-6). Each search result 606 may be associated with a user of social networking system 210 who meets at least part of the criteria of a search. Each search result may include a profile picture 608 (e.g., a corresponding one of profile pictures 608-1 through 608-6) associated with a respective user.

Additionally, some of profile pictures 608 (e.g., profile picture 608-2, profile picture 608-3, and profile picture 608-5) are surrounded by and/or visually associated with at least one of affordances 610 (e.g., at least one of affordance 610-1 through 610-3). Like affordance 510, affordances 610 may visually indicate that users associated with search result 606-2, search result 606-3, and/or search result 606-5 are both (1) participants in a discovery service of social networking system 210, and (2) are in possession of a desired user attribute (e.g., are participants of a dating service of social networking system 210). Thus, due to the inclusion of one of affordances 610, search results 606-2, 606-3, and/or 606-5 may be visually distinct from search results 606-1, 606-4, and/or 606-6. A user who views interface view 600 (e.g., user 214) may therefore readily identify the users associated with search results 606-2, 606-3 and/or 606-5 as potential connections.

Figure 7:
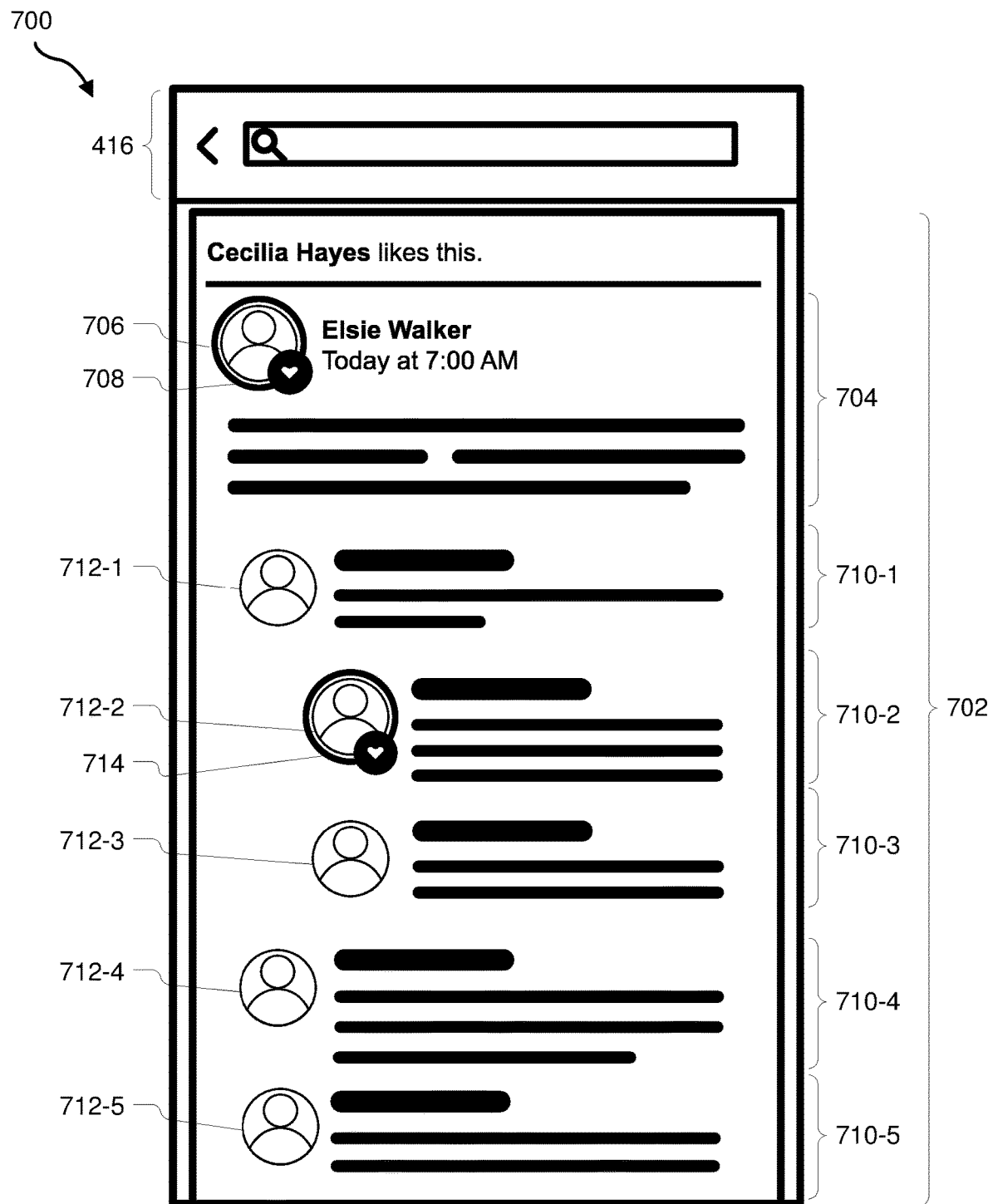

As an additional example, FIG. 7 shows an interface view 700 that includes a comment interface 702 of social networking system 210. Comment interface 702 may include a posting 704 by a user Elsie Walker. As with posting 404 shown in FIG. 4, posting 704 may be a news story shared within social networking system 210 by user Elsie Walker. Posting 704 includes a profile picture 706 of user Elsie Walker. As with posting 404 in FIG. 4, posting 704 also includes an affordance 708 that may indicate that user Elsie Walker is a participant of both a discovery service of social networking system 210 and a dating service of the social networking system.

Comment interface 702 may additionally include at least one comment 710 (e.g., comments 710-1 through 710-6) that may represent comments to posting 704 that may have been made by users of social networking system 210. Each comment 710 includes a profile picture 712 (e.g., profile pictures 712-1 through 712-2) that may be associated with a user associated with the comment 710. For example, profile picture 712-1 may be associated with a user who submitted comment 710-1, profile picture 712-2 may be associated with a user who submitted comment 710-2, and so forth.

Comment interface 702 may also include at least one affordance 714 that, like affordance 708, may indicate that a user associated with comment 710-2 and/or profile picture 712-2 may also be a participant of both a discovery service of social networking system 210 and a dating service of the social networking system. Thus, due to the inclusion of affordance 714, comment 710-2 may be visually distinct from other comments 710 included in comment interface 702 (e.g., comments 710-1 and/or comments 710-3 through 710-5). A user who views interface view 700 (e.g., user 214) may therefore readily identify a user associated with comment 710-2 as a potential connection.

By providing a visual indication (e.g., an interface affordance associated with a profile picture) that a user (1) is a participant in a discovery service of a social networking system and (2) possesses a desired user attribute when representing the user within a user interface of the social networking system, a user viewing the user interface may readily identify users who may want to make new connections and who share attributes with the user. This may enable users to serendipitously discover potential new connections as they interact with various user interfaces of the social networking system.

Additionally, in some embodiments, one or more of the systems described herein may (1) receive a selection of an additional user from the user, and (2) present at least one set of information associated with the dating service and the additional user to the user in response to receiving the selection of the additional user. For example, receiving module 104, as part of user device 202, discovery server 206, and/or dating server 208 in FIG. 2, may receive selection 230, which may indicate a selection of additional user 218, from user 214. Continuing with this example, providing module 110 may then present at least a portion of dating service data 236 associated with additional user 218 to user 214 in response to receiving selection 230. In some examples, the set of information (e.g., the portion of dating service data 236) may include a dating profile of the additional user (e.g., dating profile 232).

In some examples, a "dating profile" may include any suitable information that a participant in the dating service of the social network (e.g., additional user 218) may wish to share with other participants in the dating service, but wishes to keep private from users of the social networking system who are not participating in the dating service. For example, dating profile 232 may include, without limitation, an image of additional user 218, a text description of additional user 218, a set of interests of additional user 218, a relationship status of additional user 218, a geographic location associated with additional user 218, a set of physical attributes of additional user 218, and so forth.

Receiving module 104 may receive selection 230 in any suitable way. For example, using user interface 400 as an illustration, user 214 may interact with (e.g., tap on, click on, select, etc.) affordance 408 and/or any other interface element associated with the user associated with affordance 408 (e.g., a profile picture, a posting, a printed name, etc.). Such an interaction may cause receiving module 104 to receive information representative of the selection (e.g., the selection of user Elsie Walker) as selection 230.

Providing module 110 may, in response to receiving module 104 receiving selection 230, present at least one set of information associated with the dating service and the additional user (e.g., dating service data 236 associated with additional user 218) to user 214 in a variety of contexts. For example, one or more of modules 102 (e.g., identifying module 108, providing module 110, etc.) may cause (e.g., direct, instruct, order, etc.) user device 202 to present the set of information to user 214 via a suitable interface view of social networking interface 224.

Figure 8:
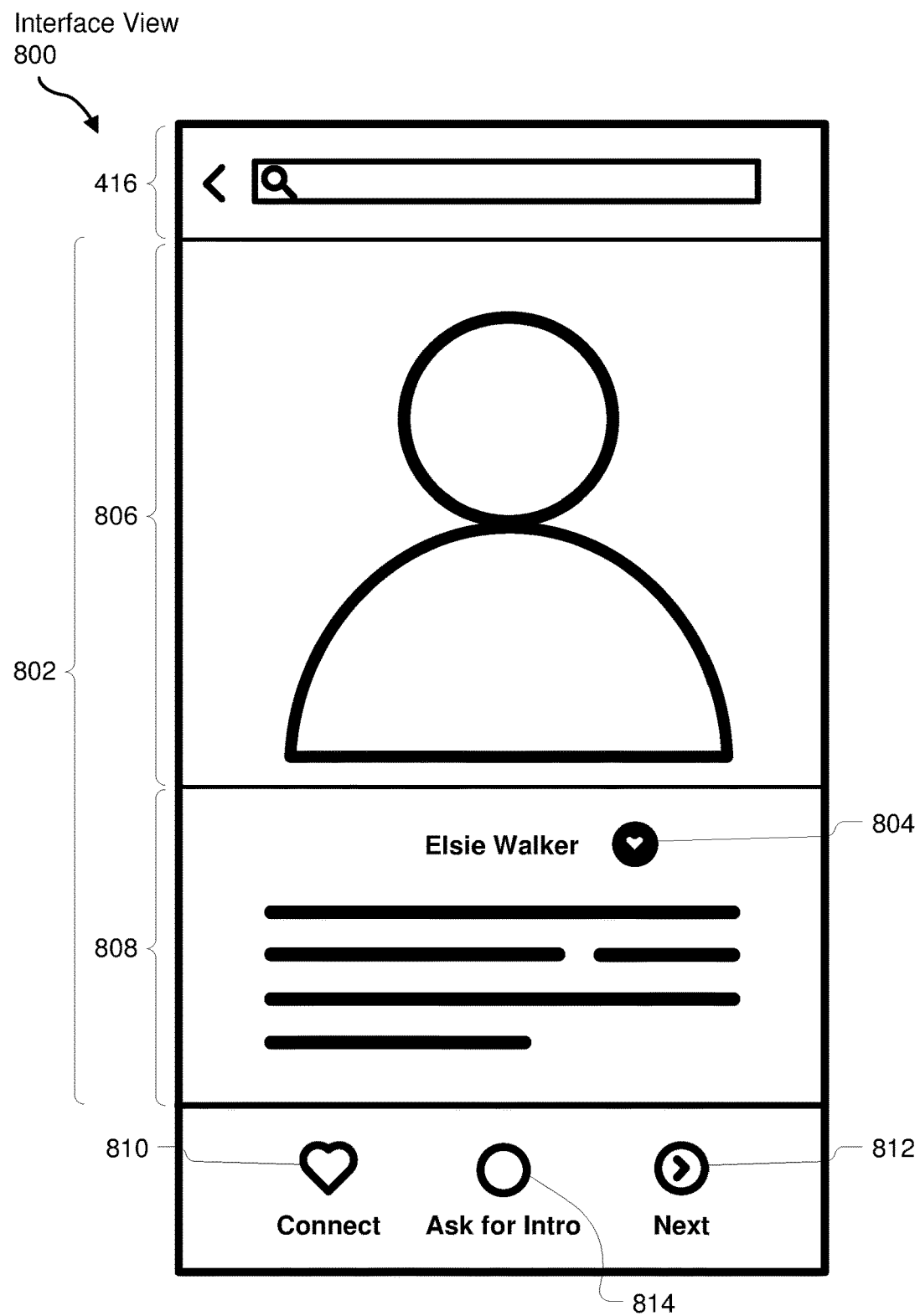
FIG. 8 includes an interface view that illustrates a social media interface that presents a dating profile associated with a participant in a dating service of a social networking system to a user of the social networking system.
Figure 9:
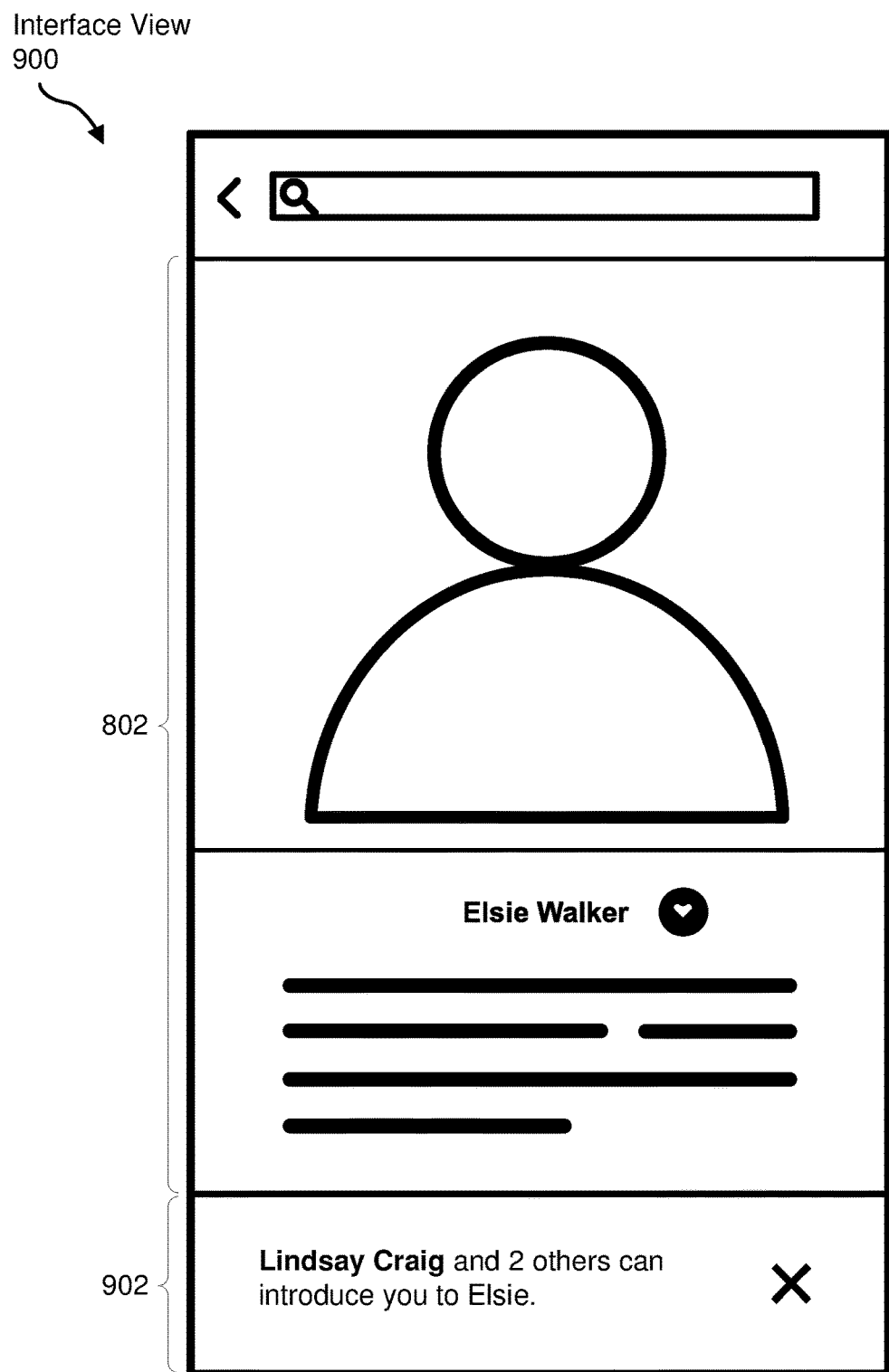
FIGS. 9-10 include interface views that illustrate example systems presenting a set of mutual friends of a user and an additional user of a social networking system who can introduce the user to the additional user to the user.

By way of illustration, FIG. 8 shows an interface view 800 that shows a version of social networking interface 224 that includes a dating profile of additional user 218. As shown, interface view 400 includes a profile view 802 that may show at least a portion of dating profile 232 of additional user 218 (e.g., user Elsie Walker). Profile view 802 may include an indicator 804 that may indicate that profile view 802 shows a dating profile of additional user 218, rather than a social networking system profile of additional user 218.

Profile view 802 may include a profile image 806, which may be an image included in dating profile 232 and selected by additional user 218 to represent additional user 218 within a dating service of social networking system 210. Likewise, profile view 802 may include profile description 808, which may, at least in part, be a description of additional user 218 included in dating profile 232. Profile description 808 may be created by additional user 218. Additionally, profile description 808 may be at least partially generated by a dating service. Profile description 808 may include any suitable media including, without limitation, a textual message from additional user 218 to other participants in the dating service, a listing of interests of additional user 218, a set of attributes of additional user 218 (e.g., physical attributes, geographic location, sexual orientation, sexual identity, religious views, etc.), a set of attributes that additional user 218 desires in potential dating connections, a media content item (e.g., video, audio, image, text, etc.) associated with and/or selected by additional user 218, and so forth.

Interface view 800 may also include a connect control 810. Connect control 810 may be an interface element that a user (e.g., user 214) may interact with (e.g., select, tap on, click on, etc.) in order to connect with additional user 218 (e.g., send a message to additional user 218 requesting a connection). Interface view 800 further includes a next profile control 812. User 214 may select next profile control 812 and, in response, one or more modules 102 (e.g., identifying module 108, providing module 110, etc.) may identify a new representation (e.g., dating profile) of another participant in the dating service of the social networking system, and may present the new representation to user 214 via interface view 800 (e.g., in replacement of profile view 802). Additionally, interface view 800 further includes an introduction request control 814. As will be described in greater detail below, in response to user 214 selecting introduction request control 814, one or more of the systems described herein may enable user 214 to request an introduction to additional user 218 from a mutual friend of user 214 and additional user 218.

In some circumstances, user 214 may wish for a mutual friend of user 214 and additional user 218 to introduce user 214 to additional user 218. Such an introduction may help to smooth the process of user 214 establishing a connection with additional user 218. Therefore, one or more of the systems described herein may identify a set of mutual friends of the user and the additional user and who can introduce the user to the additional user, and may present at least a portion of the set of mutual friends to the user. For example, identifying module 108 may, as part of user device 202, discovery server 206, and/or dating server 208 in FIG. 2, identify a set of mutual friends of user 214 and additional user 218 and who can introduce user 214 to additional user 218. Furthermore, providing module 110 may, as part of user device 202, discovery server 206, and/or dating server 208 in FIG. 2, present at least a portion of the set of mutual friends to the user.

Identifying module 108 may identify a set of mutual friends of user 214 and additional user 218 in a variety of contexts. For example, user attribute data 234 may include a set of friends of user 214 and a set of friends of additional user 218. Identifying module 108 may access user attribute data 234 and analyze the set of friends of user 214 and the set of friends of additional user 218 to identify one or more mutual friends of user 214 and additional user 218.

Additionally, providing module 110 may present at least a portion of the identified set of mutual friends to user 214 via a suitable user interface. By way of illustration, FIG. 9 includes an interface view 900 that illustrates presenting at least a portion of a set of mutual friends of user 214 and additional user 218 who can introduce user 214 to additional user 218 to user 214. As shown, interface view 900 includes profile view 802, along with a mutual friend notification 902. Mutual friend notification 902 may include any information that may notify a viewer of interface view 900 (e.g., user 214) that he or she shares at least one mutual friend with additional user 218, and that at least one of those mutual friends may be able to provide user 214 with an introduction to additional user 218. For example, mutual friend notification 902 indicates that a mutual friend Lindsay Craig and two other mutual friends can introduce user 214 to additional user 218 (e.g., Elsie Walker). In some examples, one or more modules 102 (e.g., identifying module 108, providing module 110, etc.) may present interface view 900 to user 214 (e.g., via social networking interface 224) in response to user 214 selecting introduction request control 814 shown in FIG. 8.

Figure 10:
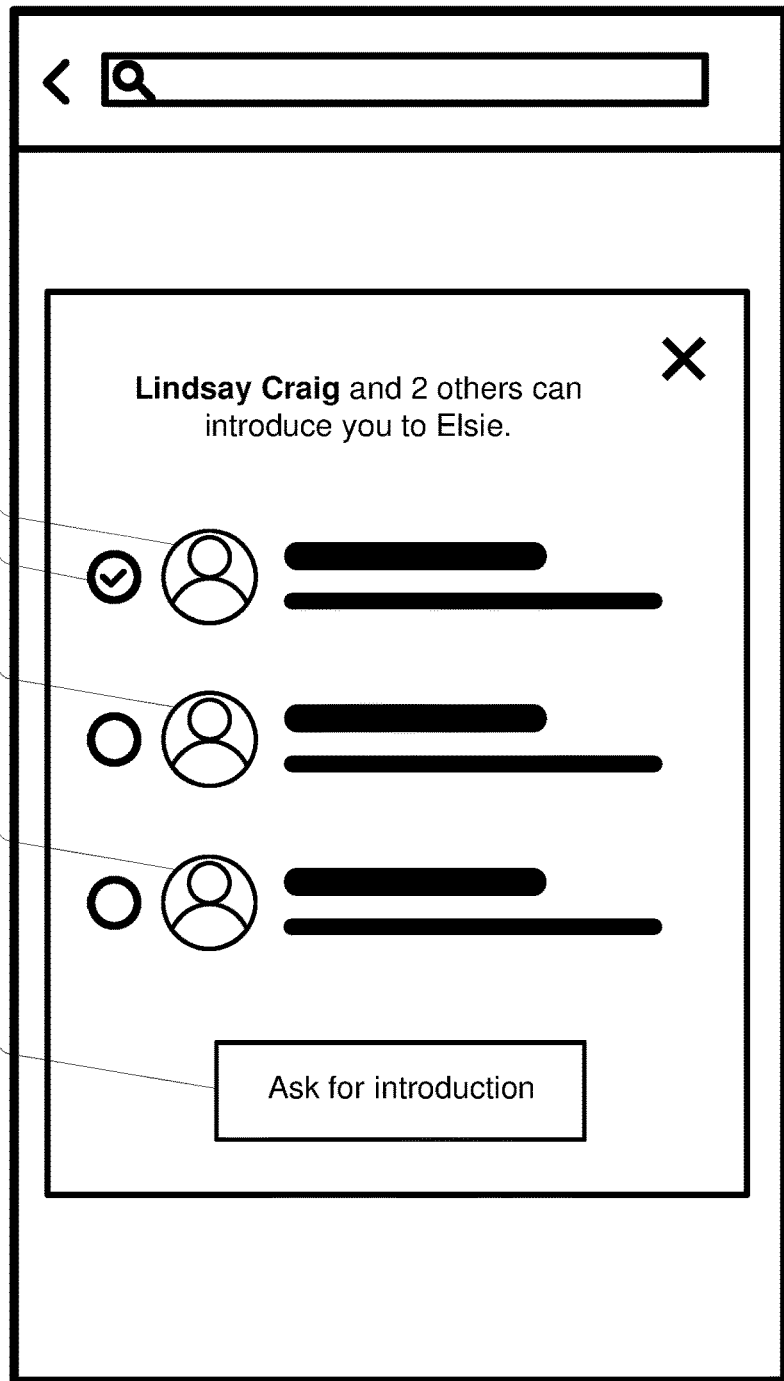
Figure 11:
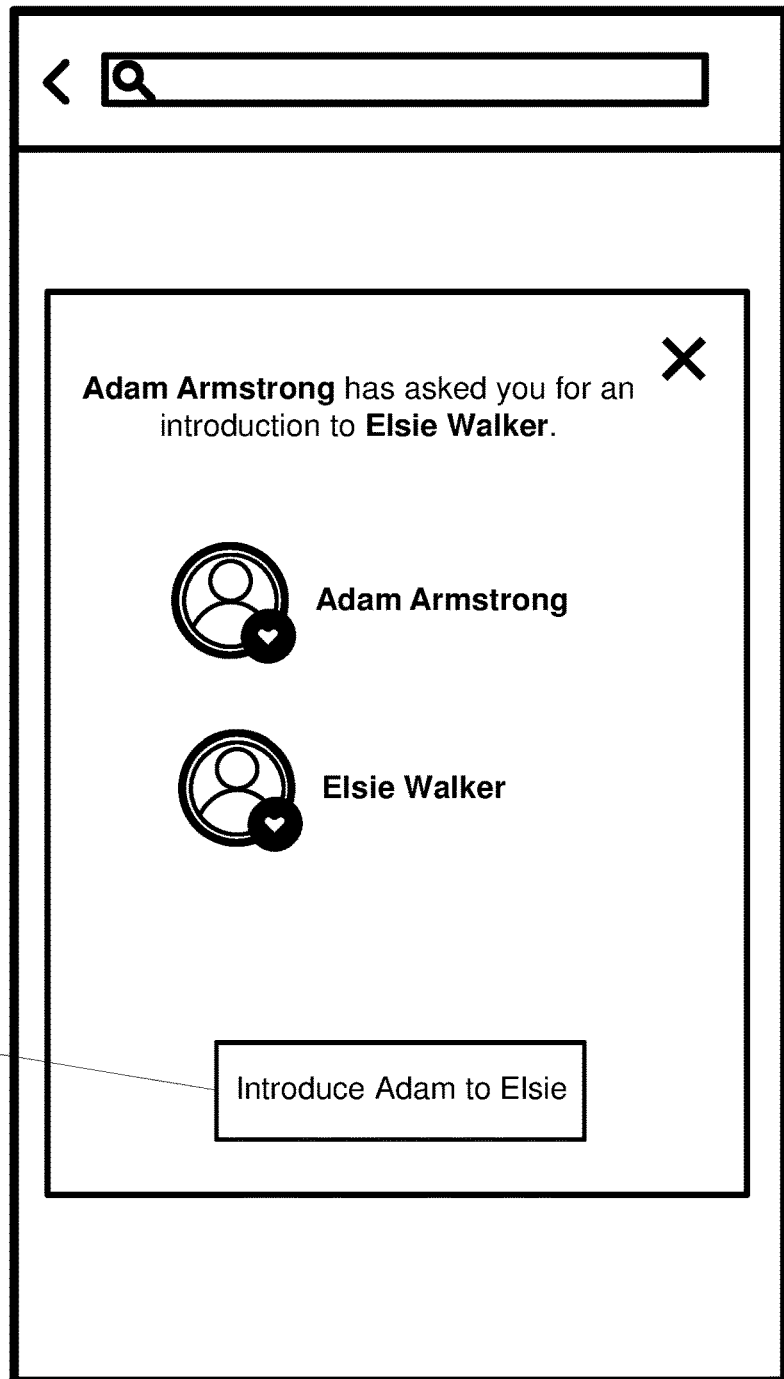
FIG. 11 includes an interface view that illustrates sending an introduction request to a mutual friend of a user and an additional user of a social networking system and receiving an introduction of the user to the additional user from the mutual friend.

As an additional example, FIG. 10 includes an interface view 1000 that also illustrates presenting a set of mutual friends of user 214 and additional user 218 who can introduce user 214 to additional user 218 to user 214. In some examples, one or more modules 102 (e.g., identifying module 108, providing module 110, etc.) may present interface view 1000 to user 214 (e.g., via social networking interface 224) in response to user 214 selecting introduction request control 814 shown in FIG. 8.

Interface view 1000 includes an introduction form 1002 that includes three mutual friend records 1004 (e.g., mutual friend record 1004-1 through mutual friend record 1004-3). Each mutual friend record 1004 may correspond to an identified mutual friend of user 214 and additional user 218. Each mutual friend record 1004 may include a corresponding selection interface (e.g., a button, a check box, a radio button, etc.) that user 214 may interact with to indicate a selection of the user associated with mutual friend record. For example, interface view 1000 includes a check box 1006 that includes a check mark. This may indicate that user 214 has selected mutual friend record 1004-1, and may intend to ask the user associated with mutual friend record 1004-1 for an introduction to additional user 218. User 214 may submit such a request by selecting introduction request control 1008.

In at least some examples, one or more of the systems described herein may (1) receive a selection of at least one mutual friend included in the set of mutual friends from the user, and may (2) send an introduction request to the mutual friend that includes a request for the mutual friend to provide the user with an introduction to the additional user. For example, receiving module 104 may, as part of user device 202, discovery server 206, and/or dating server 208 in FIG. 2, receive a selection of mutual friend 238 from user 214, and sending module 112 may send introduction request 240 to mutual friend 238 that includes a request for mutual friend 238 to provide user 214 with an introduction to additional user 218.

In some examples, a "mutual friend" (e.g., mutual friend 238) may be any user of social networking system 210 who is part of a friend relationship with a user (e.g., user 214) and an additional user (e.g., additional user 218) within a social networking system (e.g., social networking system 210). In some examples, an "introduction request" may include any data representative of a request from a user (e.g., user 214)

for a mutual friend (e.g., mutual friend 238) of the user and an additional user (e.g., additional user 218) to provide an introduction of the user to the additional user. In some examples, an "introduction" may include any data associated with a user (e.g., user 214) that may facilitate the user establishing a connection with an additional user (e.g., additional user 218) including, without limitation, a message from a mutual friend introducing the additional user to the user, at least a portion of a profile (e.g., a social networking service profile, a dating service profile, etc.) of the user, a profile picture of the user, a message from the user to the additional user, and so forth.

Receiving module 104 may receive a selection of mutual friend 238 from user 214 in any suitable way. For example, returning to FIG. 10, user 214 may select a mutual friend associated with mutual friend record 1004-1 by selecting check box 1006. User 214 may then ask for an introduction to additional user 218 (e.g., Elise Walker) from the mutual friend associated with mutual friend record 1004-1 by interacting with (e.g., selecting, tapping on, clicking on, etc.) introduction request control 1008. This may cause receiving module 104 to receive a selection of a mutual friend associated with mutual friend record 1004-1, which may be mutual friend 238.

Additionally, sending module 112 may send introduction request 240 to mutual friend 238 in any suitable way. For example, sending module 112 may send introduction request 240 to mutual friend 238 via an internal messaging service of social networking system 210 that facilitates communication among various services, modules, and/or users of social networking system 210. As another example, sending module 112 may send introduction request 240 to mutual friend 238 via an Internet-based electronic mail system.

In at least some embodiments, one or more of the systems described herein may (1) receive an introduction of the user to the additional user from the mutual friend in response to sending the introduction request to the mutual friend, and may (2) send the introduction to at least one of the user or the additional user. For example, receiving module 104 may, as part of user device 202, discovery server 206, and/or dating server 208 in FIG. 2, receive introduction 242 that introduces user 214 to additional user 218 from mutual friend 238 in response to sending module 112 sending introduction request 240 to mutual friend 238. As an additional example, sending module 112 may, as part of user device 202, discovery server 206, and/or dating server 208 in FIG. 2, send introduction 242 to user 214 and/or additional user 218.

Receiving module 104 and/or sending module 112 may perform these functions in a variety of contexts. By way of illustration, FIG. 11 includes interface view 1100 that illustrates a user interface of a social networking system (e.g., social networking system 210) that may facilitate receiving module 104 receiving an introduction of the user to the additional user (e.g., introduction 242) from a mutual friend (e.g., mutual friend 238). As shown, interface view 1100 includes an introduction interface 1102. Introduction interface 1102 may indicate to a viewer of interface view 1100 (e.g., mutual friend 238) that user 214 (e.g., user Adam Armstrong) has requested an introduction to additional user 218 (e.g., user Elise Walker). Introduction interface 1102 further includes an introduction control 1104. Mutual friend 238 may interact with (e.g., select, tap on, click on, etc.) introduction control 1104, which may cause sending module 112 to send introduction 242 to user 214 (e.g., Adam Armstrong) and/or additional user 218 (e.g., Elsie Walker) in any of the ways described herein (e.g., via an internal messaging service of social networking system 210, via an Internet-based electronic mail system, etc.).

In some circumstances, such as to reduce a cognitive burden of a particular user interface view (e.g., one or more of interface views 400 through 700), a user (e.g., user 214) may desire to hide a provided visual indication that an additional user is a participant in the discovery service and that the additional user possesses the desired attribute. Therefore, in some embodiments, one or more of the systems described herein may (1) receive an additional request from the user to hide the visual indication that the additional user is a participant in the discovery service and that the additional user possesses the desired user attribute, and may (2) hide the visual indication in response to receiving the additional request. For example, receiving module 104 may, as part of user device 202, discovery server 206, and/or dating server 208 in FIG. 2, receive an additional request from user 214 to hide visual indication 222, and providing module 110 may, as part of user device 202, discovery server 206, and/or dating server 208 in FIG. 2, hide visual indication 222 in response to receiving module 104 receiving the additional request.

Receiving module 104 may receive the additional request to hide visual indication 222 in any suitable way. For example, social networking system 210 may provide, as part of a discovery service, a configuration interface that enables user 214 to submit the additional request to hide visual indication 222. Receiving module 104 may then receive the additional request from user 214 via the provided configuration interface and/or a suitable internal messaging service of social networking system 210 that facilitates communication among various services and/or modules of social networking system 210.

Providing module 110 may hide visual indication 222 in response to receiving module 104 receiving the additional request in a variety of ways. For example, providing module 110 may remove visual indication 222 from social networking interface 224 and/or any of interface views 400 through 700. Alternatively, providing module 110 may adjust a visual appearance (e.g., a color scheme, a line style, a position, a transparency, a layer, etc.) of visual indication 222 such that visual indication 222 is no longer visually perceptible by user 214 via social networking interface 224.

Additional or alternative embodiments of the systems and methods described herein may incorporate additional or alternative operations that may similarly facilitate discovery of users who share common characteristics within a social networking system. For example, one or more of modules 102 (e.g., receiving module 104, obtaining module 106, identifying module 108, etc.) may provide one or more features of a group-based dating service. For example, one or more of modules 102 may enable a user to unlock, via an interface, one or more dating services associated with various social networking communities (e.g., groups, events, etc.) of which they are already members.

To illustrate, if a user is a member of an "I Love Corgis" group and wishes to see if there are members within this group that are interested in making dating connections with other members of the group, then one or more of modules 102 may enable the user to opt-in to a dating service associated with the group (e.g., a dating service provided by dating server 208). This may enable the user to view dating profiles of other members of the group that have also opted in to participate in the dating service associated with the group.

Similarly, if a user recently attended a friend's birthday party and met someone that they were interested in making a dating connection with, one or more of modules 102 may enable the user to opt-in to a dating service associated with the event (e.g., a dating service provided by dating server 208). This may enable the user to see if the person of interest has also opted in to the dating service associated with the event and is also interested in making dating connections with other users who attended the friend's birthday party.

In some embodiments, one or more of modules 102 may enable group administrators to enable, disable, lock, or unlock dating features or services for their group (e.g., an event planner for a funeral may disable a group-based dating service for an event associated with the funeral, while a wedding planner may enable a group-based dating service for an event associated with the wedding). In some examples, one or more of modules 102 may filter dating profiles based on a variety of criteria, such as sexual orientation, religion, likelihood of a good match with the user, and so forth. In additional or alternative examples, access to the dating service may be time-limited (e.g., limited to one week following an event).

Additionally, in some embodiments, one or more of modules 102 may enable and/or disable one or more features associated with a group and/or a group-based dating service in order to facilitate user privacy and/or security when a user participates in group-based dating service associated with the group. For example, one or more of modules 102 may enable, limit, and/or disable a messaging service associated with a group and/or a group-based dating service associated with the group based on one or more criteria. Thus, a messaging service associated with a group and/or a group-based dating service may be tailored and/or limited to enhance user safety and/or privacy (e.g., messaging between two or more group members may be limited to text only until certain criteria are met to avoid offensive images, spam solicitations, etc.).

As discussed throughout the instant disclosure, the disclosed systems and methods may provide one or more advantages over traditional options for discovering users who share common characteristics within a social networking system. For example, by visually distinguishing participants in a discovery service of a social networking system who possess desired user attributes from other users of the social networking system, an embodiment of the systems and methods described herein may enable a user to readily identify other users who are both interested in connecting with other users and who possess common attributes with the user, such as a shared geographic location, a shared interest, a shared participation in a dating service of the social networking system, and so forth. Furthermore, by providing such a visual distinction within various interfaces of the social networking system (e.g., a content feed interface, a group interface, a search interface, a comment interface, etc.) embodiments of the instant disclosure may enable a user to serendipitously discover potential connections (e.g., other users of the social networking system who are also participating in the discovery service and who share a common attribute with the user) while interacting with the various interfaces of the social networking system.

Additionally, some embodiments of the disclosed systems and methods may further facilitate establishing new connections between users by enabling a user who discovers an additional user who may be a good potential connection (e.g., an additional user who shares a common characteristic with the user) to request an introduction to the additional user from a mutual friend of the user and the additional user. Such an introduction may help to smooth the process of establishing a connection between the user and the additional user by leveraging an existing level of trust between the user and the mutual friend, as well as an additional existing level of trust between the mutual friend and the additional user.

Furthermore, some embodiments of the systems and methods described herein may facilitate a user making dating connections within a dating service of a social networking system by visually indicating users who are participating in the discovery service and who are also participating in the dating service (e.g., users who are participating in the discovery service and who share a common attribute with the user of participating in the dating service). In some examples, a common attribute the user and a potential connection (e.g., an additional user who is participating in the discovery service) may share may be a level of compatibility greater than a predetermined threshold level of compatibility within the dating service. Embodiments of the systems and methods described herein may therefore facilitate discovery by the user of other users with whom the user may share at least the predetermined threshold level of compatibility, and may therefore enable the user to make high-quality, lasting connections (e.g., dating connections) with other participants of dating service.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data associated with a participant in a discovery service of a social networking system to be transformed, obtain data representative of at least one desired user attribute, transform the data associated with the participant and/or the data representative of the desired user attribute, output a result of the transformation to identify an additional user of the social networking system who is both a participant in the discovery service and who also possesses the desired user attribute, use the result of the transformation to provide a visual indication, when representing the additional user within a user interface of the social networking system, that the additional user is a participant in the discovery service and that the additional user possesses the desired user attribute, and store the result of the transformation to provide the visual indication within a variety of user interfaces of the social networking system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some examples, a "computer-readable medium" may include any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, via a social networking system, a request from a user to participate in a discovery service of the social networking system designed to facilitate connections between users of the social networking system who share common attributes;
   obtaining, from the user, data representative of at least one desired user attribute, possessed by the user, for new user connections;
   identifying, within the social networking system, at least one additional user who is both a participant in the discovery service and who also possesses the desired user attribute; and
   providing a visual indication, when representing the additional user within a user interface of the social networking system, that the additional user is a participant in the discovery service and that the additional user possesses the desired user attribute, the visual indication comprising an interface affordance associated with a social media post generated by the additional user, wherein the interface affordance visually distinguishes the social media post from an additional social media post generated by another user of the social network who is not a participant in the discovery service and does not possess the desired attribute.

2. The computer-implemented method of claim 1, wherein providing the visual indication to the user when representing the additional user within the user interface of the social networking system comprises providing the visual indication to the user when representing the social media post generated by the additional user within at least one of:
   a content feed interface of the social networking system;
   a group interface of the social networking system;
   a search interface of the social networking system; or
   a comment interface of the social networking system.

3. The computer-implemented method of claim 1, wherein:
   the discovery service comprises a dating service of the social networking system; and
   the additional user is also a participant in the dating service of the social networking system.

4. The computer-implemented method of claim 3, wherein identifying the additional user comprises determining that the user and the additional user have at least a threshold level of compatibility within the dating service.

5. The computer-implemented method of claim 3, further comprising:
   receiving a selection of the additional user from the user; and
   presenting at least one set of information associated with the dating service and the additional user to the user in response to receiving the selection of the additional user.

6. The computer-implemented method of claim 5, wherein the set of information comprises a dating profile of the additional user.

7. The computer-implemented method of claim 1, further comprising:
   identifying a set of mutual friends of the user and the additional user and who can introduce the user to the additional user; and
   presenting at least a portion of the set of mutual friends to the user.

8. The computer-implemented method of claim 7, further comprising:
receiving a selection of at least one mutual friend included in the set of mutual friends from the user; and
sending an introduction request to the mutual friend, the introduction request comprising a request for the mutual friend to provide the user with an introduction to the additional user.

9. The computer-implemented method of claim 8, further comprising:
receiving an introduction of the user to the additional user from the mutual friend in response to sending the introduction request to the mutual friend; and
sending the introduction to at least one of:
the user; or
the additional user.

10. The computer-implemented method of claim 1, wherein identifying the additional user further comprises determining that the additional user is excluded from a set of friends of the user and that the user is excluded from a set of friends of the additional user.

11. The computer-implemented method of claim 1, wherein:
the computer-implemented method further comprises receiving, from the additional user, permission to indicate to users of the social networking system who are participants in the discovery service and who also possess the desired user attribute that the additional user is also a participant in the discovery service and that the additional user also possesses the desired user attribute; and
identifying the additional user is based on the permission received from the additional user.

12. The computer-implemented method of claim 1, further comprising:
receiving an additional request from the user to hide the visual indication that the additional user is a participant in the discovery service and that the additional user possesses the desired user attribute; and
hiding the visual indication in response to receiving the additional request.

13. The computer-implemented method of claim 4, wherein determining that the user and the additional user have at least the threshold level of compatibility within the dating service is based on interactions of the additional user with other users of the discovery service.

14. A system comprising:
a receiving module, stored in memory, that receives, via a social networking system, a request from a user to participate in a discovery service of the social networking system designed to facilitate connections between users of the social networking system who share common attributes;
an obtaining module, stored in memory, that obtains, from the user, data representative of at least one desired user attribute, possessed by the user, for new user connections;
an identifying module, stored in memory, that identifies, within the social networking system, at least one additional user who is both a participant in the discovery service and who also possesses the desired user attribute;
a providing module, stored in memory, that provides a visual indication to the user, when representing the additional user within a user interface of the social networking system, that the additional user is a participant in the discovery service and that the additional user possesses the desired user attribute, the visual indication comprising an interface affordance associated with a social media post generated by the additional user, wherein the interface affordance visually distinguishes the social media post from an additional social media post generated by another user of the social network who is not a participant in the discovery service and does not possess the desired attribute; and
at least one physical processor that executes the receiving module, the obtaining module, the identifying module, and the providing module.

15. The system of claim 14, wherein:
the desired user attribute comprises an indication that the user is a participant in a dating service of the social networking system; and
the additional user is also a participant in the dating service of the social networking system.

16. The system of claim 15, wherein the identifying module further identifies the additional user by determining that the user and the additional user have at least a threshold level of compatibility within the dating service.

17. The system of claim 15, wherein:
the receiving module further receives a selection of the additional user from the user; and
the providing module further presents a dating profile of the additional user to the user in response to receiving the selection of the additional user.

18. The system of claim 15, wherein:
the identifying module further identifies a set of mutual friends of the user and the additional user and who can introduce the user to the additional user;
the providing module further presents at least a portion of the set of mutual friends to the user;
the receiving module further receives a selection of at least one mutual friend included in the set of mutual friends from the user;
the system further comprises a sending module, stored in memory, that sends an introduction request to the mutual friend, the introduction request comprising a request for the mutual friend to provide the user with an introduction to the additional user; and
the physical processor further executes the sending module.

19. The system of claim 18, wherein:
the receiving module further receives an introduction of the user to the additional user from the mutual friend in response to the sending module sending the introduction request to the mutual friend; and
the sending module further sends the introduction to at least one of:
the user; or
the additional user.

20. A non-transitory computer-readable medium comprising computer-readable instructions that, when executed by at least one processor of a computing system, cause the computing system to:
receive, via a social networking system, a request from a user to participate in a discovery service of the social networking system designed to facilitate connections between users of the social networking system who share common attributes;
obtain, from the user, data representative of at least one desired user attribute, possessed by the user, for new user connections;

identify, within the social networking system, at least one additional user who is both a participant in the discovery service and who also possesses the desired user attribute; and provide a visual indication to the user, when representing the additional user within a user interface of the social networking system, that the additional user is a participant in the discovery service and that the additional user possesses the desired user attribute, the visual indication comprising an interface affordance associated with a social media post generated by the additional user, wherein the interface affordance visually distinguishes the social media post from an additional social media post generated by another user of the social network who is not a participant in the discovery service and does not possess the desired attribute.

* * * * *